(12) United States Patent
Irwin et al.

(10) Patent No.: US 8,770,250 B2
(45) Date of Patent: Jul. 8, 2014

(54) THERMOFORMABLE WEB JOINING APPARATUS

(75) Inventors: Jere F. Irwin, Yakima, WA (US); Dale L. Vantrease, Naches, WA (US)

(73) Assignee: Jere F. Irwin, Yakima, WA (US)

(*) Notice: Subject to any disclaimer, the term of this patent is extended or adjusted under 35 U.S.C. 154(b) by 0 days.

(21) Appl. No.: 13/453,858

(22) Filed: Apr. 23, 2012

(65) Prior Publication Data

US 2012/0205053 A1  Aug. 16, 2012

Related U.S. Application Data

(62) Division of application No. 12/692,377, filed on Jan. 22, 2010, now Pat. No. 8,163,118.

(60) Provisional application No. 61/218,979, filed on Jun. 21, 2009.

(51) Int. Cl.
B29C 65/02 (2006.01)

(52) U.S. Cl.
USPC ........ 156/380.7; 156/157; 156/159; 156/256; 156/258; 156/263; 156/272.2; 156/273.3; 156/304.1; 156/304.6; 156/322; 156/380.9; 156/502; 156/504; 156/510; 156/517; 156/518; 156/519; 156/535; 156/539

(58) Field of Classification Search
None
See application file for complete search history.

(56) References Cited

U.S. PATENT DOCUMENTS

| | | | |
|---|---|---|---|
| 2,719,324 A | 10/1955 | Gray et al. | |
| 3,768,943 A | 10/1973 | Maihart | |
| 3,769,124 A | 10/1973 | Johnson | |
| 3,834,971 A * | 9/1974 | Johnson | 156/507 |
| 3,879,254 A | 4/1975 | Hay | |
| 3,939,032 A | 2/1976 | Taitel et al. | |
| 3,956,047 A | 5/1976 | Johnson | |
| 3,957,567 A | 5/1976 | Pursell et al. | |
| 3,995,791 A | 12/1976 | Schoppee | |
| 4,001,067 A | 1/1977 | Johnson | |
| 4,157,934 A | 6/1979 | Ryan et al. | |
| 4,161,364 A | 7/1979 | Hanai et al. | |
| 4,190,475 A | 2/1980 | Marschke | |
| 4,190,483 A | 2/1980 | Ryan et al. | |
| 4,197,149 A * | 4/1980 | Freitag et al. | 156/154 |
| 4,234,365 A | 11/1980 | Shimizu et al. | |
| 4,260,444 A | 4/1981 | Fowler | |
| 4,262,855 A | 4/1981 | Haag | |
| 4,284,463 A | 8/1981 | Wright | |
| 4,310,378 A | 1/1982 | Bosco | |
| 4,315,794 A | 2/1982 | Palmieri | |
| 4,386,988 A | 6/1983 | Kontz | |
| 4,412,835 A | 11/1983 | Spencer | |
| 4,481,053 A | 11/1984 | Tokuno et al. | |
| 4,506,842 A | 3/1985 | Beck | |

(Continued)

*Primary Examiner* — Mark A Osele
*Assistant Examiner* — Nickolas Harm
(74) *Attorney, Agent, or Firm* — Wells St. John P.S.

(57) ABSTRACT

An apparatus is provided for splicing together old and new thermoformable sheets in order to supply a continuous thermoforming operation. The apparatus is used to join together thermoformable sheets by: providing a first thermoformable sheet with a trailing edge and a second thermoformable sheet with a leading edge; forming a terminal edge portion with a hot element along the trailing edge and a complementary terminal edge portion along the leading edge by severing a scrap sheet from each portion; laterally retracting each scrap portion away from the trailing edge and the leading edge; and joining together the first thermoformable sheet and the second thermoformable sheet by interlocking together the terminal edge portion with the complementary terminal edge portion.

20 Claims, 43 Drawing Sheets

(56) References Cited

U.S. PATENT DOCUMENTS

| | | | |
|---|---|---|---|
| 4,543,152 | A | 9/1985 | Nozaka |
| 4,555,070 | A | 11/1985 | Pali |
| 4,564,149 | A | 1/1986 | Barzano |
| 4,599,130 | A | 7/1986 | Woodley |
| 4,629,531 | A | 12/1986 | Kataoka |
| 4,645,558 | A | 2/1987 | Sato |
| 4,652,329 | A | 3/1987 | Focke |
| 4,769,098 | A | 9/1988 | Cederholm et al. |
| 4,801,342 | A | 1/1989 | Wheeler et al. |
| 4,880,178 | A | 11/1989 | Goulette |
| 4,896,424 | A | 1/1990 | Walker |
| 4,984,750 | A | 1/1991 | Shigeta et al. |
| 5,064,488 | A * | 11/1991 | Dickey ......................... 156/159 |
| 583,718 | A | 1/1992 | Chen |
| 5,083,718 | A | 1/1992 | Chen |
| 5,338,387 | A | 8/1994 | Noll |
| 5,669,998 | A | 9/1997 | Ward et al. |
| 5,772,150 | A | 6/1998 | Spatafora |
| 5,779,184 | A | 7/1998 | Kaufmann et al. |
| 5,871,137 | A | 2/1999 | Ege et al. |
| 5,899,406 | A | 5/1999 | Payne |
| 5,902,431 | A * | 5/1999 | Wilkinson et al. ............ 156/159 |
| 6,059,710 | A | 5/2000 | Rajala et al. |
| 6,074,333 | A | 6/2000 | Rajala et al. |
| 6,165,306 | A | 12/2000 | Rajala |
| 6,228,205 | B1 | 5/2001 | Rhodes et al. |
| 6,520,236 | B1 | 2/2003 | Rajala |
| 6,527,902 | B1 | 3/2003 | Rajala |
| 6,565,034 | B1 | 5/2003 | Hesse et al. |
| 6,978,816 | B1 | 12/2005 | Byrne et al. |

* cited by examiner

STEP 4

SHEET FLOW

STEP 4

STEP 5

SHEET FLOW

STEP 6

SHEET FLOW

STEP 7

SHEET FLOW

STEP 7

SHEET FLOW

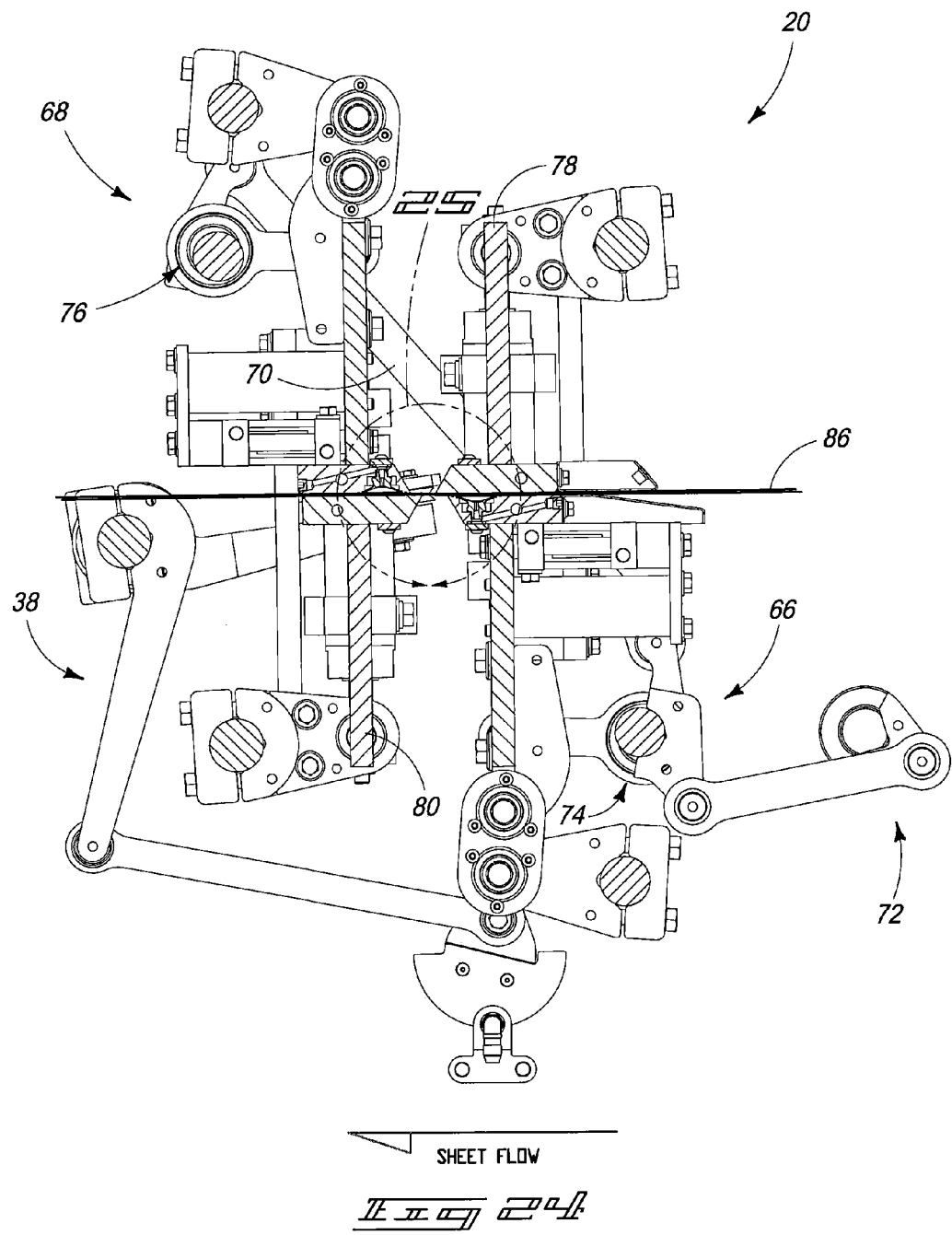

STEP 8

SHEET FLOW

STEP 8

SHEET FLOW

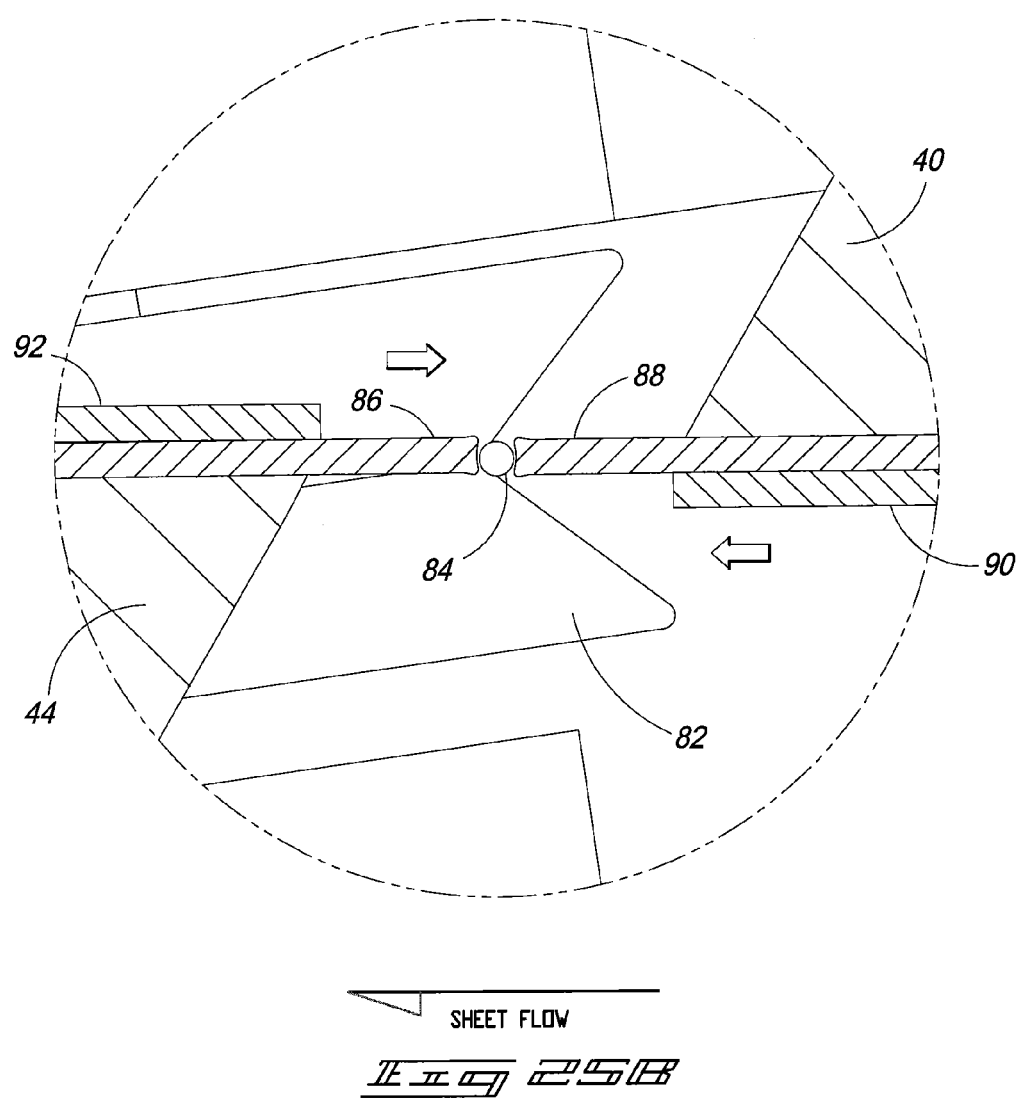

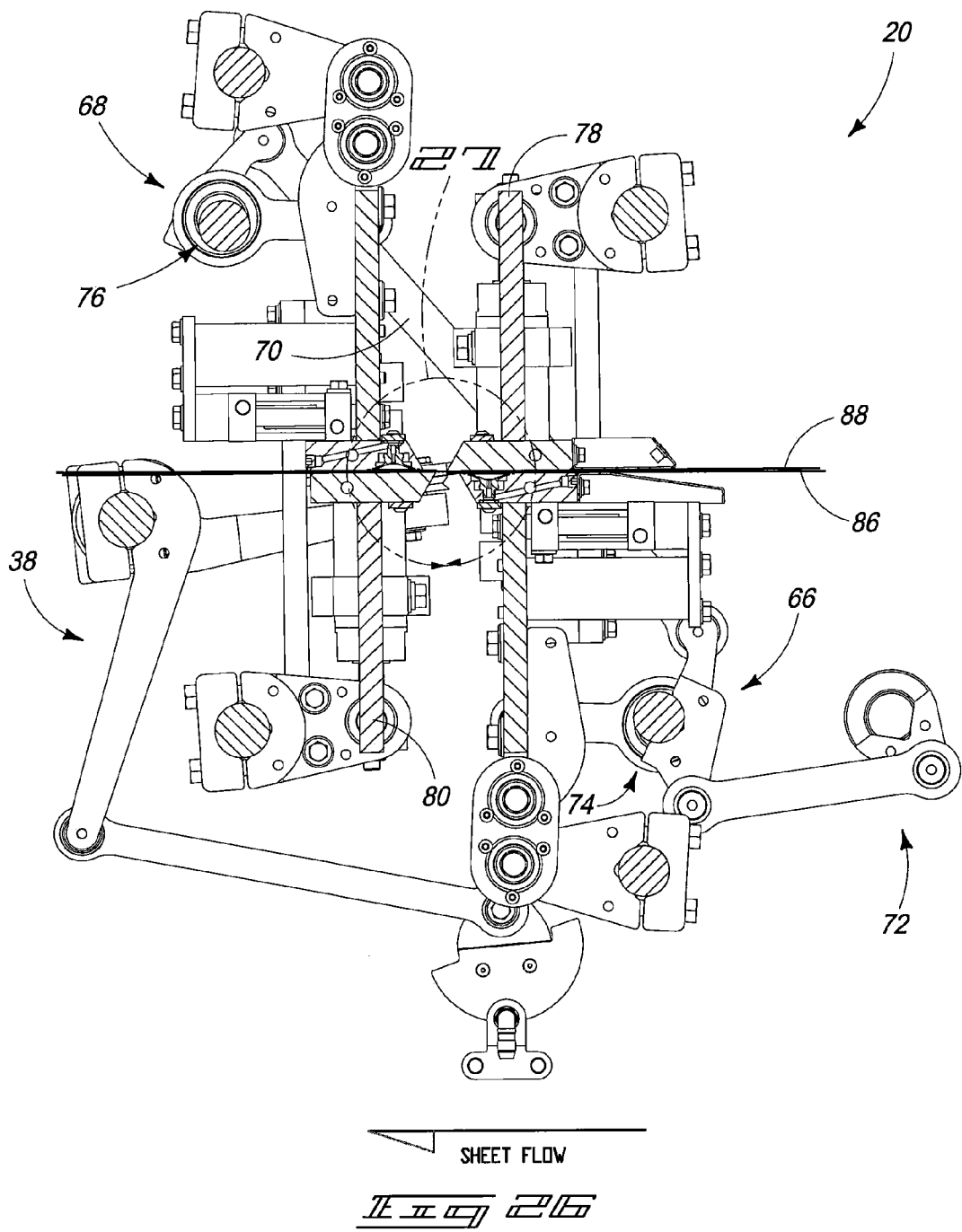

STEP 9

SHEET FLOW

STEP 9

SHEET FLOW

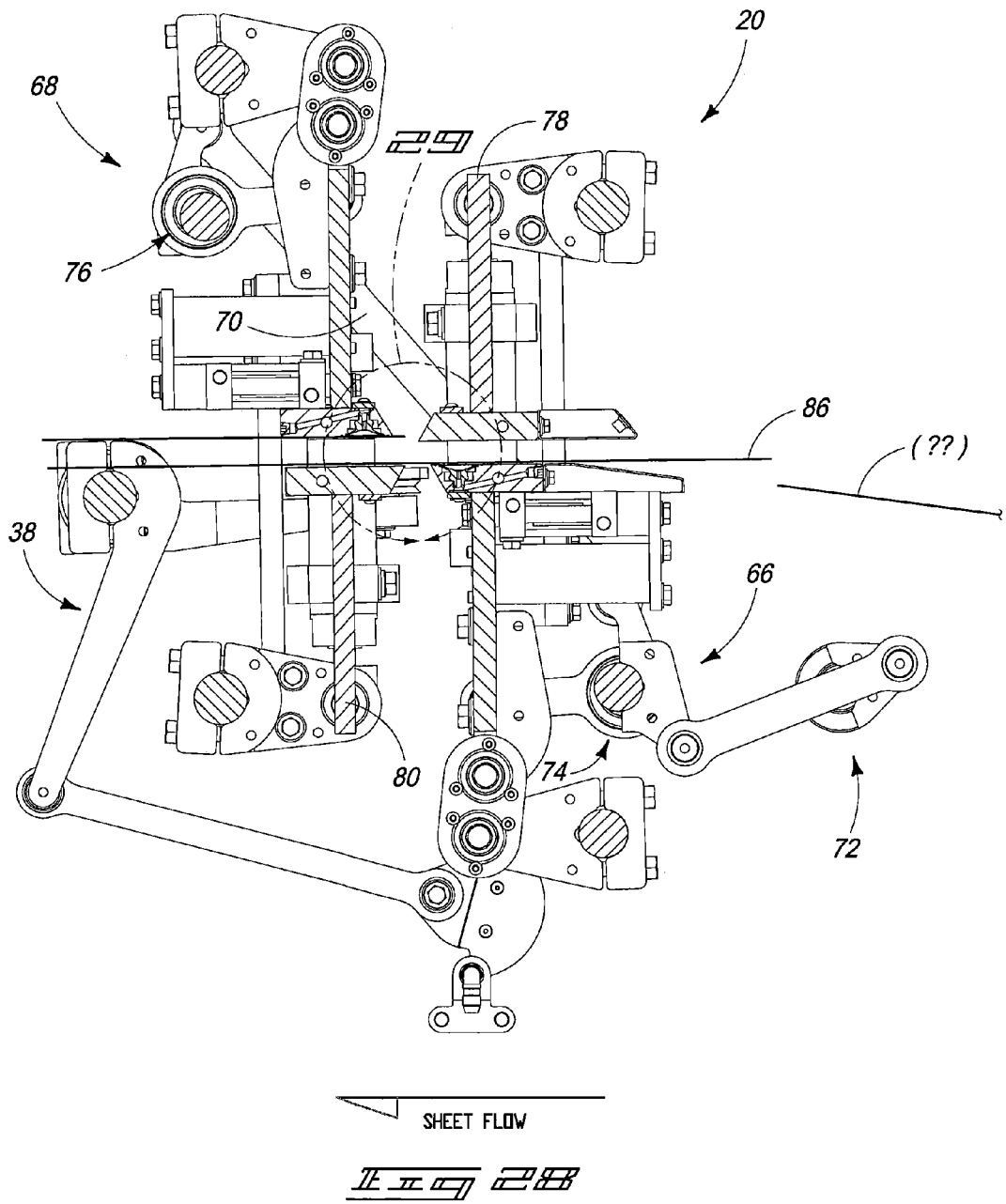

STEP 10

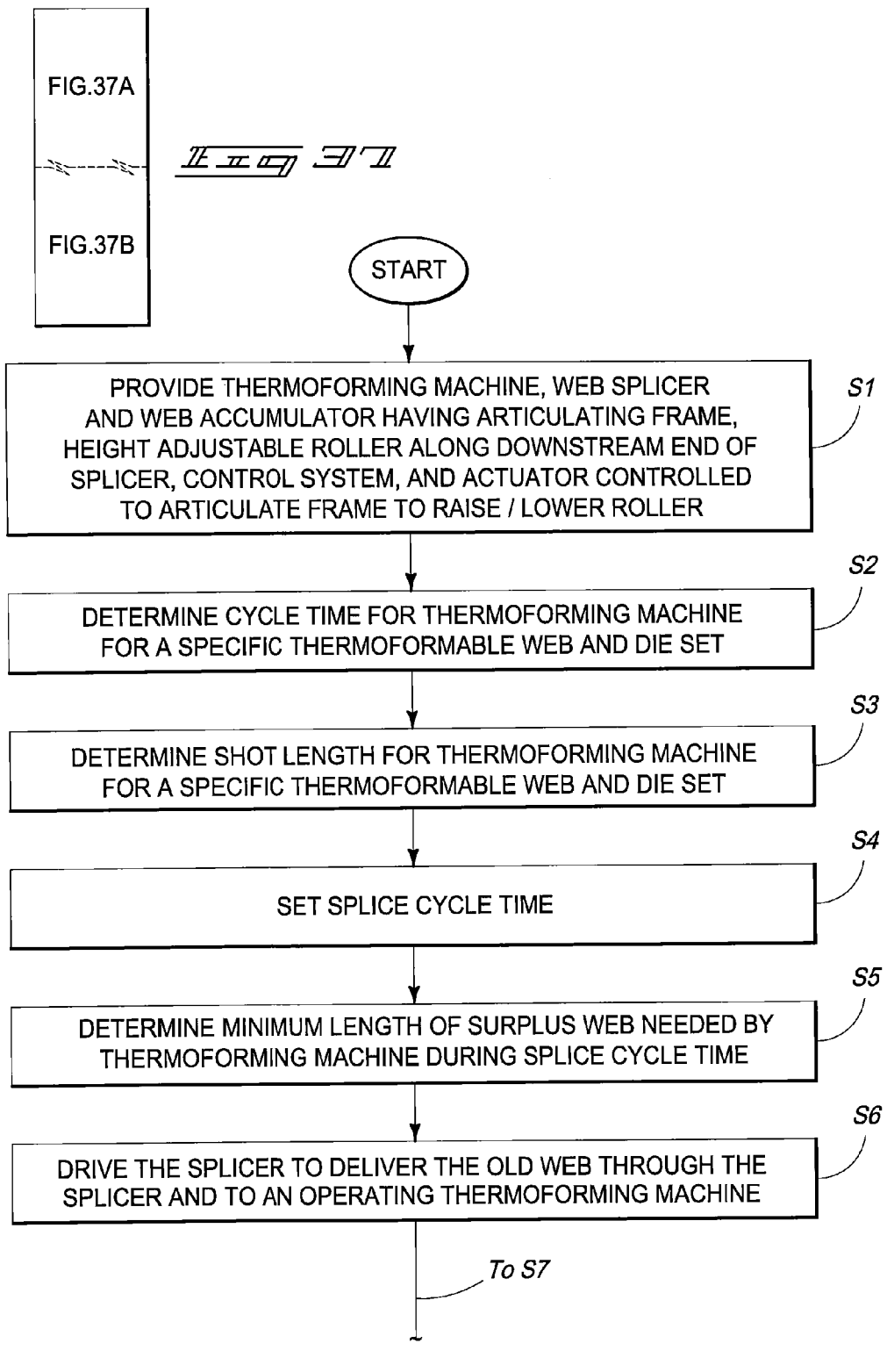

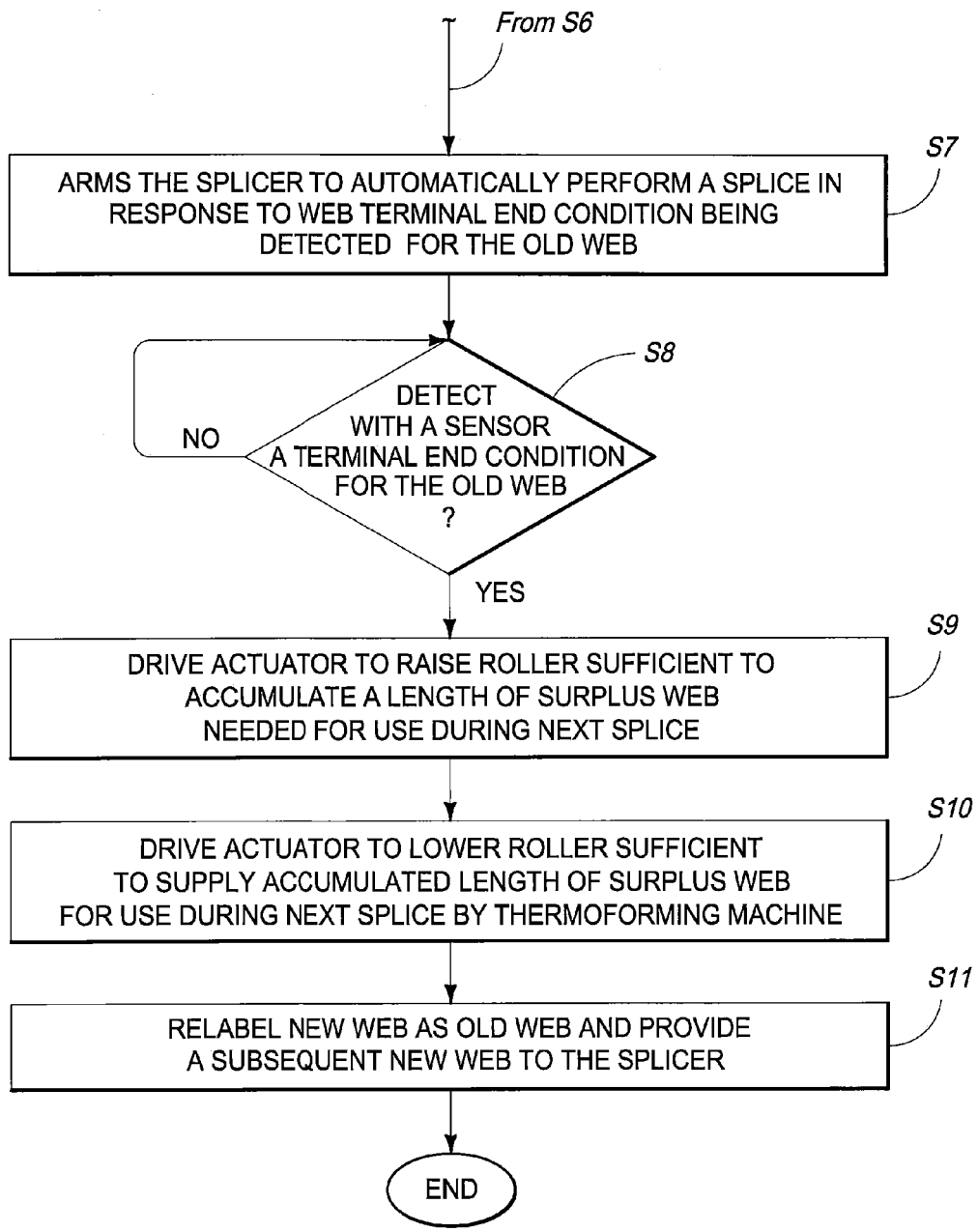

THERMOFORMABLE WEB JOINING APPARATUS

RELATED PATENT DATA

This application is a divisional of U.S. patent application Ser. No. 12/692,377 which was filed Jan. 22, 2010, entitled "Thermoformable Web Splicer and Method", which claims priority to U.S. Provisional Patent Application Ser. No. 61/218,979 which was filed Jun. 21, 2009, entitled "Hot Wire Splicer", the entirety of each of which is incorporated by reference herein.

TECHNICAL FIELD

This invention pertains to apparatus and methods for splicing together films or sheets of thermoplastic material. More particularly, the present invention relates to butt welding of thermoplastic sheet stock material with a splice to continuously deliver sheet material to a thermoforming process.

BACKGROUND OF THE INVENTION

Apparatus and methods are known for joining together sheets of thermoplastic film being used to feed a thermoforming apparatus. Taping splicing apparatus are known. Attempts have been made to butt weld thermoplastic sheets and films in an effort to continuously supply sheet to a thermoforming apparatus. However, no one has been successful in perfecting a process that is continuous and does not interrupt operation of the thermoforming apparatus. For example, U.S. Pat. Nos. 3,769,124; 3,834,971; 3,956,047; and 4,001,067 illustrate one attempt to splice sheets of thermoplastic film, but a lack of commercial success resulted due to shortcomings.

SUMMARY OF THE INVENTION

A splicing apparatus and method are provided for butt welding or splicing together a trailing end of a thermoplastic sheet of stock material with a leading end of a thermoplastic sheet of stock material to impart a continuous supply of sheet. A pair of clamps are used to manipulate and position the overlapped sheets while a hot wire is manipulated to sever the sheets and weld together the heated ends of the sheets, thereby joining them together into a continuous sheet.

According to one aspect, a method is provided for joining together thermoformable sheets. The method includes: providing a first thermoformable sheet overlapped with a second thermoformable sheet; moving a heating element through the first sheet and the second sheet to form a trailing terminal edge and a leading terminal edge, respectively; aligning in proximate, spaced-apart relation the trailing terminal edge and the leading terminal edge; inserting the heating element between and spaced from the trailing terminal edge and the leading terminal edge; while holding the heating element between the trailing terminal edge and the leading terminal edge, heating the trailing terminal edge and the leading terminal edge with the heating element sufficiently to impart melt-back of each edge away from the heating element at a melt-back rate; while heating the leading terminal edge and the trailing terminal edge, moving the leading terminal edge and the trailing terminal edge each towards the heating element at a rate no greater than the melt-back rate so as to prevent contact of each edge with the heating element while maintaining proximity with the heating element to deliver heat to each edge; removing the heating element from between the trailing terminal edge and the leading terminal edge; and after removing, fusing together the leading terminal edge and the trailing terminal edge by moving together the leading terminal edge and the trailing terminal edge until respective melted portions on each edge engage.

According to another aspect, a method is provided for joining together thermoformable sheets. The method includes providing a first thermoformable sheet with a trailing terminal edge and a second thermoformable sheet with a leading terminal edge; aligning in proximate, spaced-apart relation the trailing terminal edge and the leading terminal edge; inserting a heating element between and spaced from the trailing terminal edge and the leading terminal edge; while holding the heating element between the trailing terminal edge and the leading terminal edge, heating the trailing terminal edge and the leading terminal edge with the heating element sufficiently to impart melt-back of each edge away from the heating element at a melt-back rate; while heating the leading terminal edge and the trailing terminal edge, moving the leading terminal edge and the trailing terminal edge each towards the heating element at a rate no greater than the melt-back rate so as to prevent contact of each edge with the heating element while maintaining proximity with the heating element to deliver heat to each edge; removing the heating element from between the trailing terminal edge and the leading terminal edge; and after removing, moving the leading terminal edge and the trailing terminal edge together until respective melted portions on each edge engage.

According to yet another aspect, an apparatus is provided for joining together thermoformable sheets. The apparatus includes a frame, an entrance vacuum clamping bar assembly, an exit vacuum clamping bar assembly, a sheet severing mechanism, and at least one sheet actuator. The entrance vacuum clamping bar assembly is supported by the frame and has a vacuum clamping member supported for movement toward and away for a vacuum servo member generally perpendicular to a sheet travel path. The vacuum clamping member is further supported for retraction and extension parallel to the sheet travel path. The exit vacuum clamping bar assembly is supported by the frame downstream of the entrance vacuum clamping bar assembly and has a clamping member supported for movement toward and away from a vacuum servo member generally perpendicular to a sheet travel path. The vacuum clamping member is further supported for retraction and extension parallel to the sheet travel path. The sheet severing mechanism is provided for severing an overlapped old sheet and new sheet. The at least one actuator is carried by the frame and is configured to move each of the vacuum clamping members toward and away from a splice to retract scrap sheet away from a splice line between the entrance vacuum clamping bar assembly and the exit vacuum clamping bar assembly. One of the entrance and exit vacuum clamping member is provided above the respective vacuum servo member and another of the entrance and exit vacuum clamping member is provided below the respective vacuum servo member.

These and other aspects of the present invention will be described in greater detail hereinafter.

BRIEF DESCRIPTION OF THE DRAWINGS

Preferred embodiments of the invention are described below with reference to the following accompanying drawings.

FIG. 24 is a vertical sectional view of selected splicer section components corresponding with a sheet approach mode.

FIG. 25B is further enlarged view taken from the encircled region 25 of FIG. 25, but taken later in time than FIG. 25A.

FIG. 26 is a vertical sectional view of selected splicer section components corresponding with a wire withdraw and sheet load mode.

FIG. 28 is a vertical sectional view of selected splicer section components corresponding with a sheet apart and scrap withdrawal mode.

FIG. 37 is a process flow diagram assembled together from FIGS. 37A and 37B and showing the logic processing for accumulating surplus web needed by a thermoforming machine during a web splicing operation.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to one embodiment of Applicants' invention for a thermoforming sheet splicing apparatus and method for joining together old and new thermoformable plastic sheets of material for continuously feeding a thermoforming press when molding articles. While the invention is described by way of one embodiment, it is understood that the description is not intended to limit the invention to such embodiment, but is intended to cover alternatives, equivalents, and modifications which may be broader than the embodiment, but which are included within the scope of the appended claims.

In an effort to prevent obscuring the invention at hand, only details germane to implementing the invention will be described in great detail, with presently understood peripheral details being omitted, as needed, as being presently understood in the art.

Figure 1:
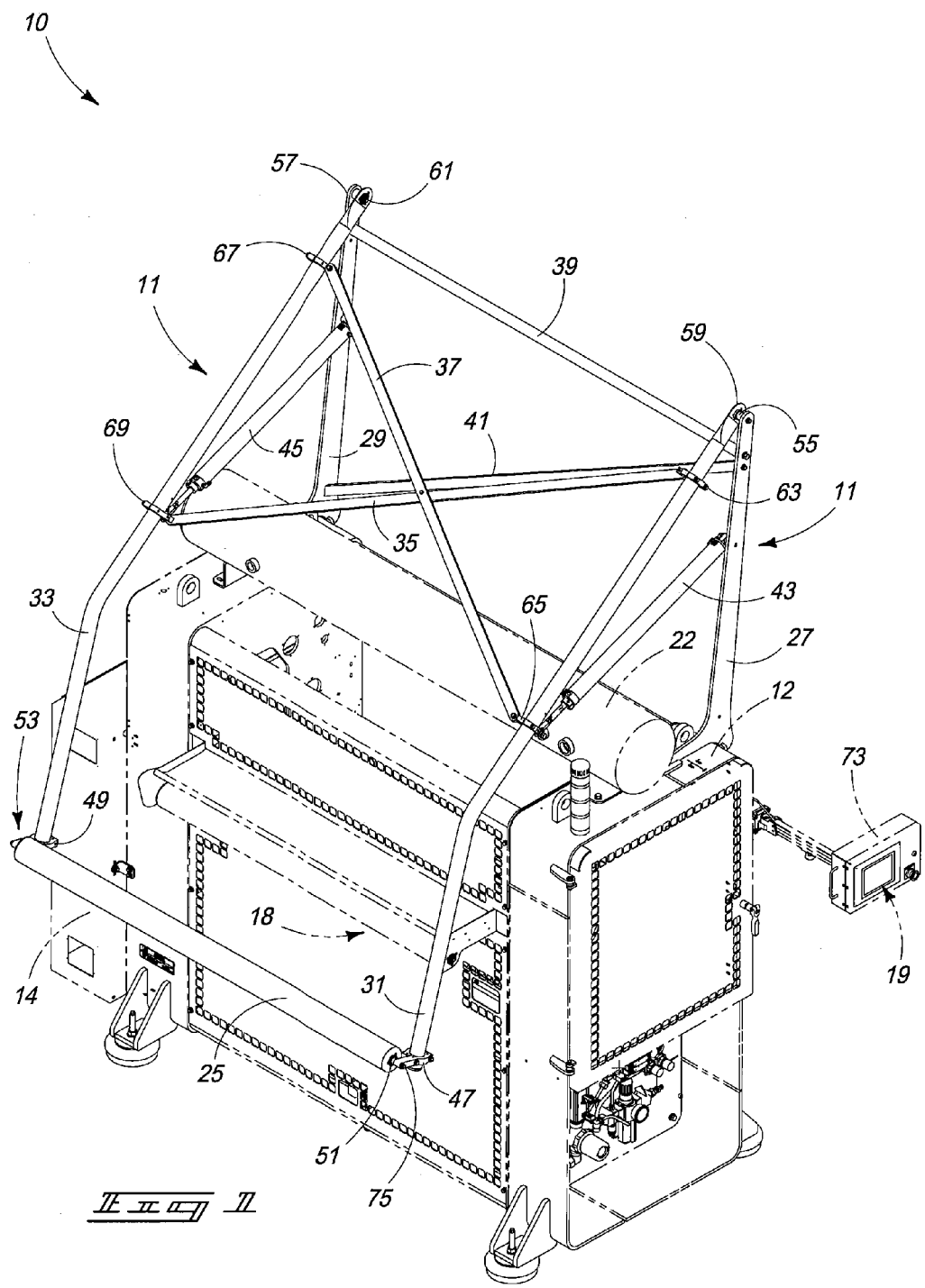
FIG. 1 is a perspective view from above of a web splicing apparatus including a downstream web accumulator shown in a lowered position.
Figure 2:
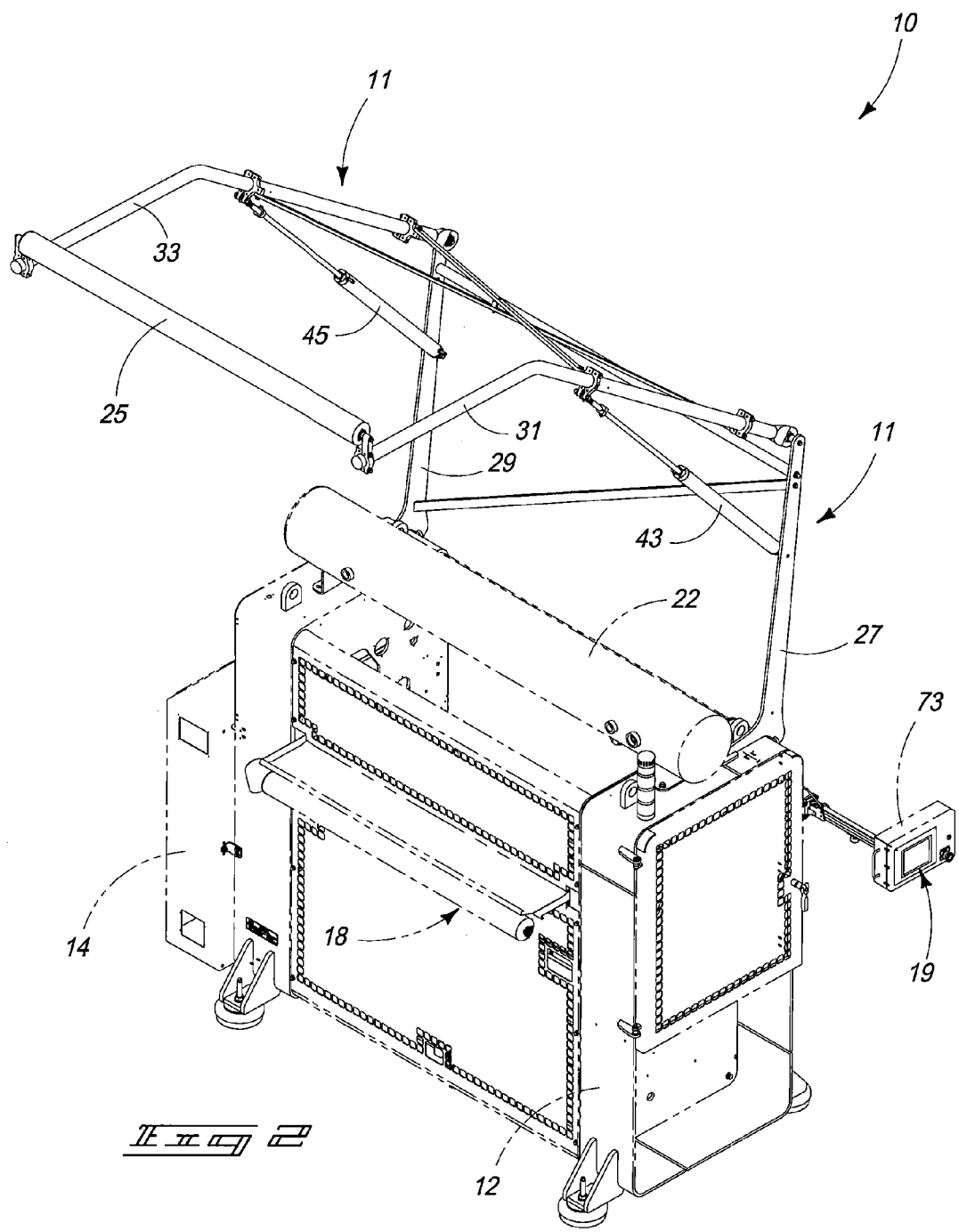
FIG. 2 is a perspective view of the web splicing apparatus of claim 1 and showing the web accumulator shown in raised position.
Figure 3:
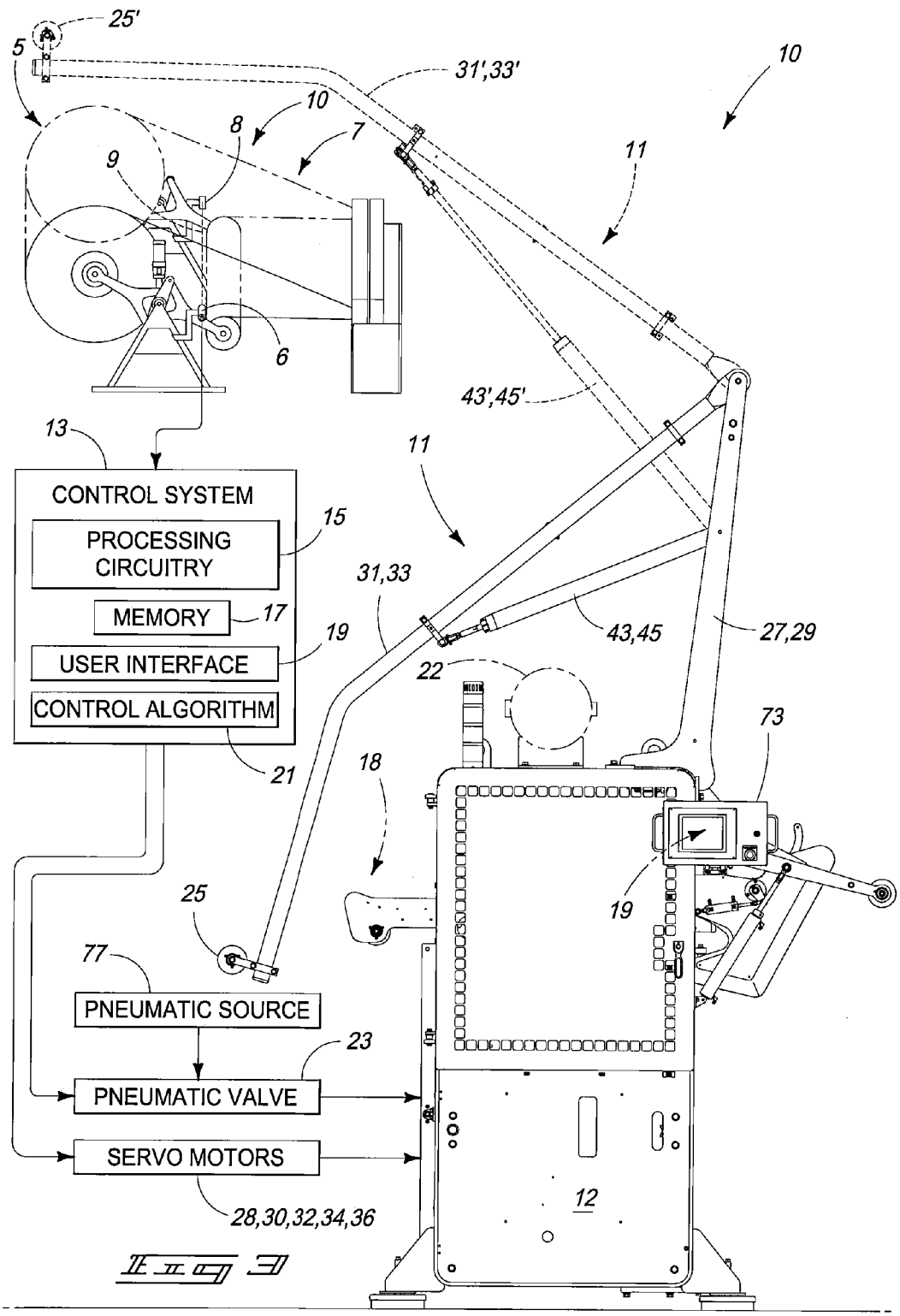
FIG. 3 is a simplified elevational view of the web splicing apparatus of FIGS. 1-2 showing the web accumulator in a lowered and raised position, including a block diagram of control system and drive components along with a simplified perspective view of a web payout.

FIGS. 1-3 show a sheet or web splicing apparatus 10 according to the present invention. As shown in FIGS. 1-3, apparatus 10 includes a web accumulator 11 that is mounted atop a splicer frame 12. Web splicing apparatus 10 operates to splice a leading edge of a new web onto a trailing edge of an old web, each typically stored as a roll, in a manner that does not interrupt feeding of a thermoformable web into a continuously operating thermoforming line. Web accumulator 11 has been omitted from FIGS. 4-6 in order to simplify the drawings, but it is understood that accumulator 11 is normally provided atop apparatus 10 in FIGS. 4-6, according to one implementation. Optionally, accumulator 11 can be omitted and another form of accumulation device can be used in conjunction with the remaining portion of apparatus 10. Alternatively, accumulator 11 can be omitted from apparatus 10 or can be provided as a separate stand-along machine. Web accumulator 10 is raised in order to store an extra length of thermoformable web sheet material during a web splicing operation so that delivery of the web to a downstream thermoforming machine does not interrupt operation of the thermoforming machine during a web splicing operation. The accumulated length is paid out during a splicing operation.

As shown in FIG. 1, web accumulator 11 provides a cylindrical support roller 25 that is raised and lowered in order to temporarily store an extra length of thermoformable web to supply the web while a splicing operation is being performed with apparatus 10, such that a downstream thermoforming operation does not need to be slowed down or stopped during a splicing operation. A typical thermoforming operation is continuous, with a thermoformable web being delivered in a continuously fed, intermittent motion matching the motion of platens opening and closing on a heated web such that the web is stopped during a forming step and moved after the thermoforming step to prepare for a subsequent thermoforming step.

Web accumulator 11 includes a pair of support arms 27 and 29 that mount onto frame 12 of apparatus 10 with a plurality of threaded fasteners (not shown). A pair of curved tubular lift arms 31 and 33 is pivotally supported at a top end of each support arm 27 and 29, respectively. A distal end of each lift arm 31 and 33 supports one end of a cylindrical roller 25 for rotation. A web of thermoformable material that leaves exit assembly 18 passes over roller 25. By raising roller 25, an extra length of web can be stored atop roller 25 for later use while the web is being shuttled back and forth within splicing apparatus 10 when splicing together a nearly depleted, or old web and a new web.

More particularly, roller 25 is raised and lowered by extending and retracting a pair of pneumatic cylinders 43 and 45 that mount between support arms 27 and 29 and lift arms 31 and 33, respectively, with a pivot pin at each end. Alternatively, a linear servo drive and motor, rack and pinion, ball screw, or other moving device can be used in place of pneumatic cylinders 43 and 45 in order to raise and lower roller 25.

FIG. 2 shows roller 25 in a raised configuration, whereas FIG. 1 shows roller 25 in a lowered configuration. A pair of cross bars 39 and 41, each of rectangular cross section, are connected between support arms 27 and 29 with threaded fasteners to stiffen arms 31 and 33. Likewise, a pair of cross bars 35 and 37 is connected between lift arms 31 and 33 with clamp brackets 63, 69 and 65, 67, respectively. Bars 35 and 37 are further secured together where they cross using a spacer boss and a through-bolt fastener.

According to one construction, roller 25 is formed from a cylindrical piece of aluminum machined with a central bore and cylindrical end grooves that each receive a standard deep groove roller ball bearing 51 and 53, respectively. A central bolt shaft 75 extends through roller 25, as well as inner races of bearings 51 and 53, and bolts onto end mounting brackets 47 and 49 on arms 31 and 33, respectively.

Proximal ends of lift arms 31 and 33 are each pivotally supported by support arms 27 and 29 using cylindrical ball bearing assemblies 59 and 61, respectively. A cylindrical stand-off shaft 55 and 57 is mounted onto each arm 27 and 29, respectively. An inner race of each bearing assembly 59 and 61 is mounted onto each stand-off shaft 55 and 57, respectively. Each lift arm 31 and 33 is constructed from a piece of formed steel conduit, with a proximal end being crimped together. A cylindrical bore is then formed in the crimped portion of each arm 31 and 33, into which an outer race of each bearing assembly 59 and 61 is then secured with a press-fit.

FIG. 2 illustrates accumulator 11 articulated to a position with roller 25 raised in order to accumulate a web of thermoformable material exiting exit assembly 18 of splicer 10. A web of thermoformable material leaves splicer 10 via exit assembly 18 and passes over roller 25. Roller 25 is raised and the web is fed at an increased rate prior to a splicing operation in order to accumulate an extra length of web material over roller 25, which is later used to feed a thermoforming machine downstream of splicer 10 during a splicing operation. During the splicing operation, the accumulated web is used to feed a downstream thermoforming machine. Roller 25 is lowered at a controlled rate in order to supply the accumulated web during a splicing operation to the thermoforming machine, while preventing the web from collecting on a factory floor.

As shown in FIG. 3, a computer 73 having a user interface 19 enables setup and operator control of a control system 13 (see FIG. 3) that configures the height, timing and speed with which roller 25 is raised prior to and during a web splicing operation using splicer 10.

FIG. 3 illustrates control system 13 in a simplified block diagram form for controlling operation of splicer 10, including controlled articulation of accumulator 11. Control system 13 is implemented on computer 73. Control system 13 includes processing circuitry 15, memory 17, user interface 19 and a control algorithm 21.

Control algorithm 21 enables control system 13 to control delivery of pneumatic fluid from a pneumatic source 77 via a pneumatic control valve 23 and to control operation of servomotors 28, 30, 32, 34 and 36. According to one implementation, control algorithm 21 includes a recipe comprising control settings that can be set and retrieved to raise roller 25 to a sufficient height and at an appropriate rate based upon operating characteristics of a specific thermoforming line. For example, a specific thermoformable web material on a specific thermoforming line will operate with a specific shot length and with a specific cycle time. This information is combined with a period of time needed to perform a web splice, thereby enabling determination of how much web needs to be accumulated in order to prevent any need to slow down or stop the thermoforming line.

In order to enable automatic operation of splicer 10 to perform a splice between a terminal portion of an old web roll and a leading portion of a new web roll, a sensing apparatus is implemented on a web roll payout 5. The sensing apparatus comprises an optical sensor 6 having an emitter and detector that combines with an aligned mirror 8 to provided an optical line of sight 9 that generates a signal when an old web roll is nearly depleted. Such signal is received by control system 13. Sensor 6 and mirror 8 generate a feedback signal to control system 13 when an old roll reduces in diameter sufficient that sensor 6 detects a reflected back signal from mirror 8, corresponding with a diameter of the old web roll falling below a specific size. A time delay is then implemented by control system 13, after which a splice is implemented automatically corresponding with a terminal end portion of the old web roll being proximate splicer 10, ensuring a splice before the old web passes through splicer 10.

Figure 4:
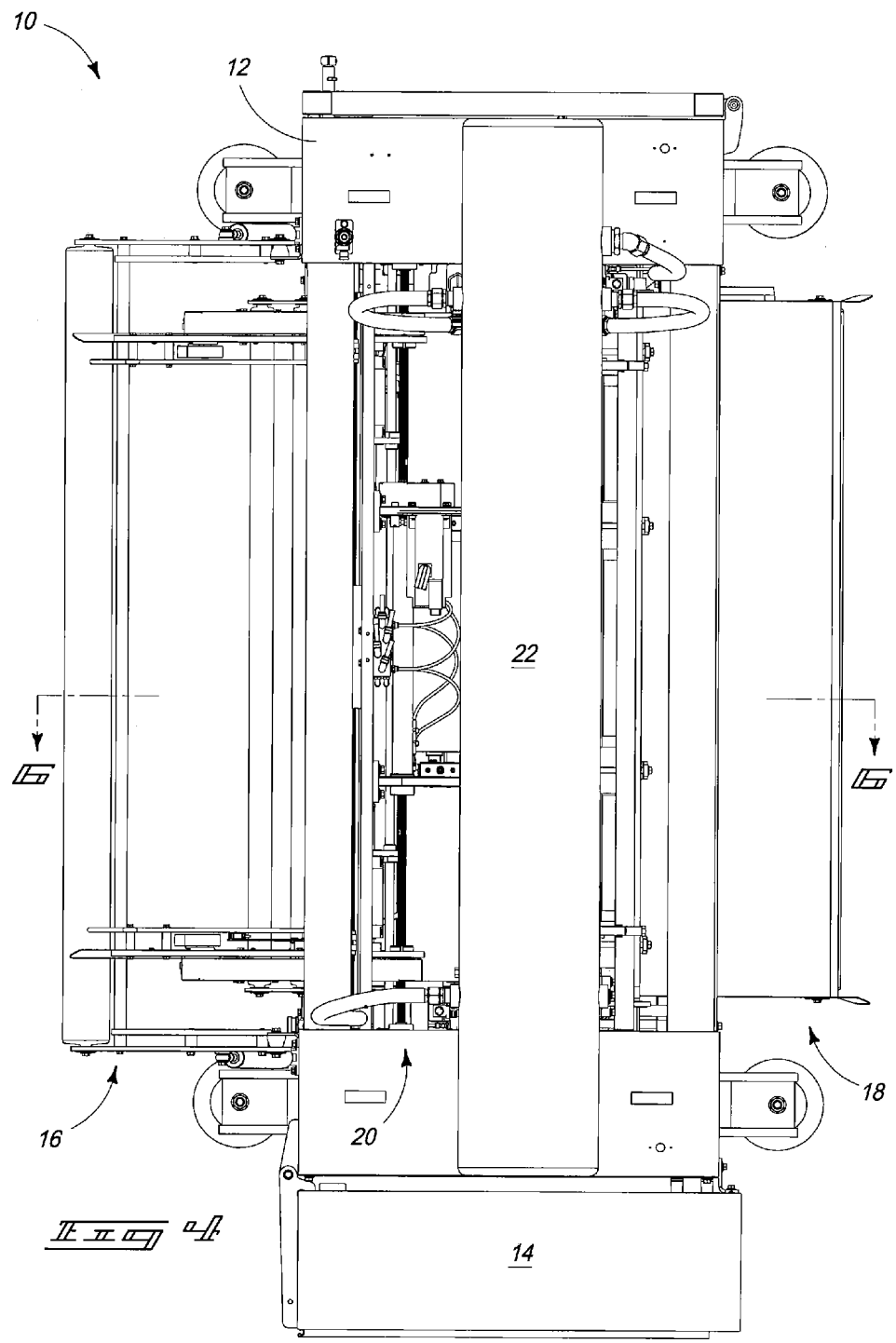
FIG. 4 is a simplified plan view of a web splicing apparatus.
Figure 5:
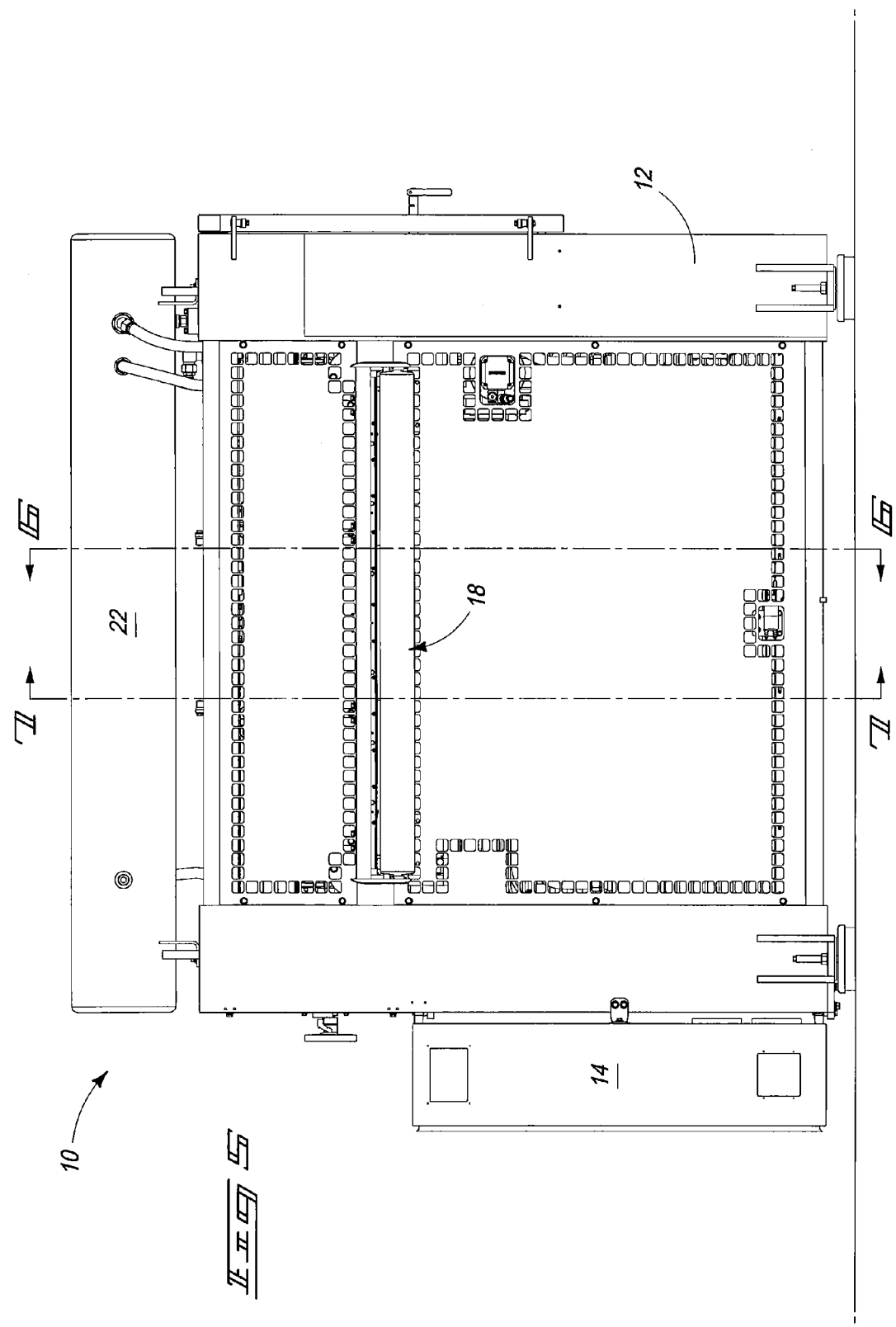
FIG. 5 is a simplified right elevational view of the web splicing apparatus of FIG. 1 from the downstream end.
Figure 6:
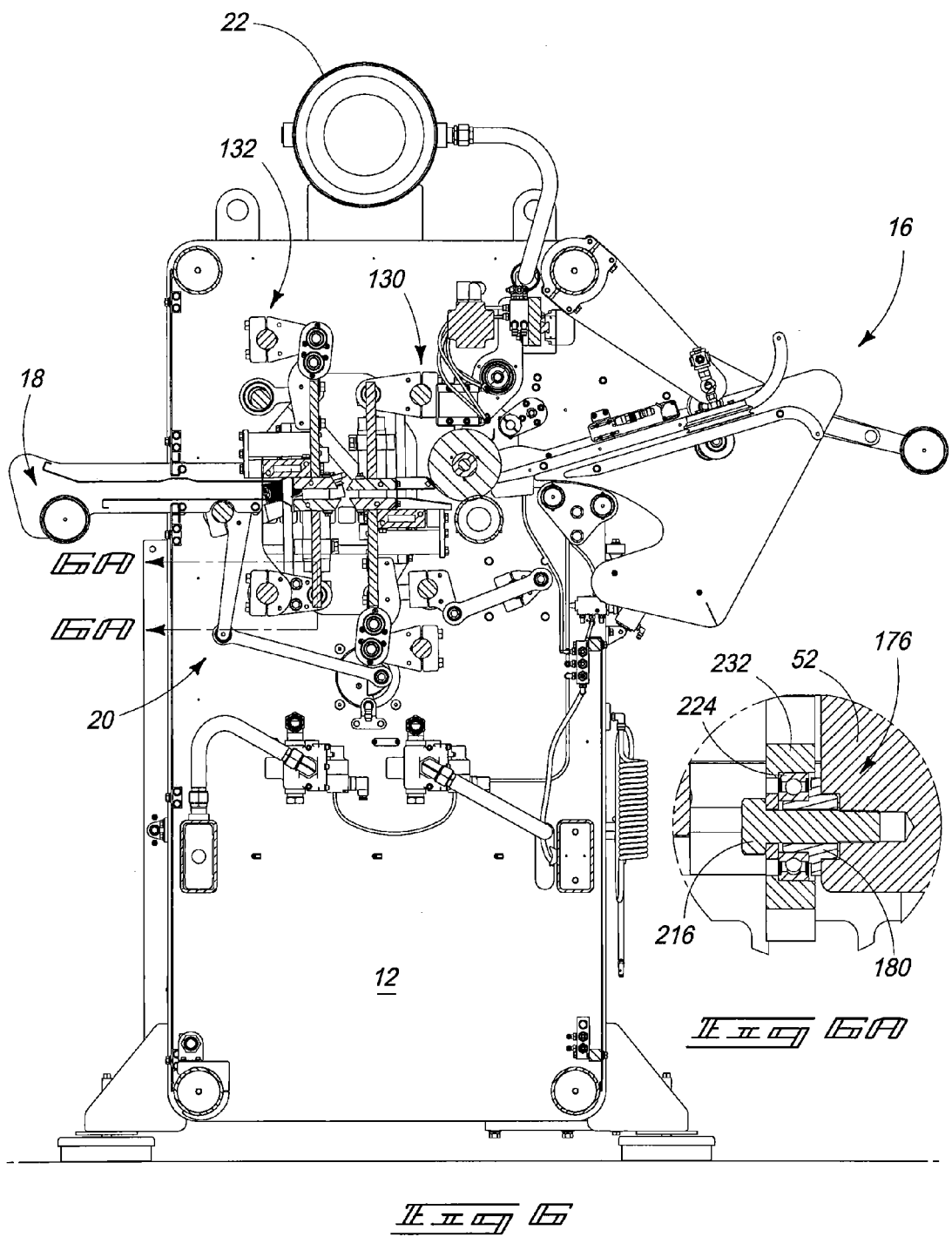
FIG. 6 is a simplified vertical sectional view taken along line 6-6 of FIG. 4.

FIGS. 4-6 further illustrate construction of web splicing apparatus 10. In order to simplify the drawings, accumulator 11 has been omitted but is understood to be mounted atop apparatus 10 as depicted in FIGS. 1-3 above. Optionally, accumulator 11 can be provided by a separate stand-along device. Apparatus 10 has a frame 12 that supports a control box 14, an entrance pre-feed assembly 16, an exit assembly 18 and a splice section assembly 20. A vacuum tank 22 for storing a source of vacuum air is provided atop frame 12.

FIG. 6 illustrates pre-feed assembly 16 where a new sheet of thermoformable material is received into the machine. The sheet is then advanced to the splice section assembly 20 where it is spliced together with a trailing end of an old sheet of thermoformable material. The sheet normally exits the machine via the exit assembly 18. Tank 22 supplies an air vacuum from a vacuum source (not shown) for vacuum bars and clamp bars of the splice section assembly 20. The splice section assembly 20 includes an entrance vacuum bar assembly 130 and an exit vacuum bar assembly 132.

Figure 7:
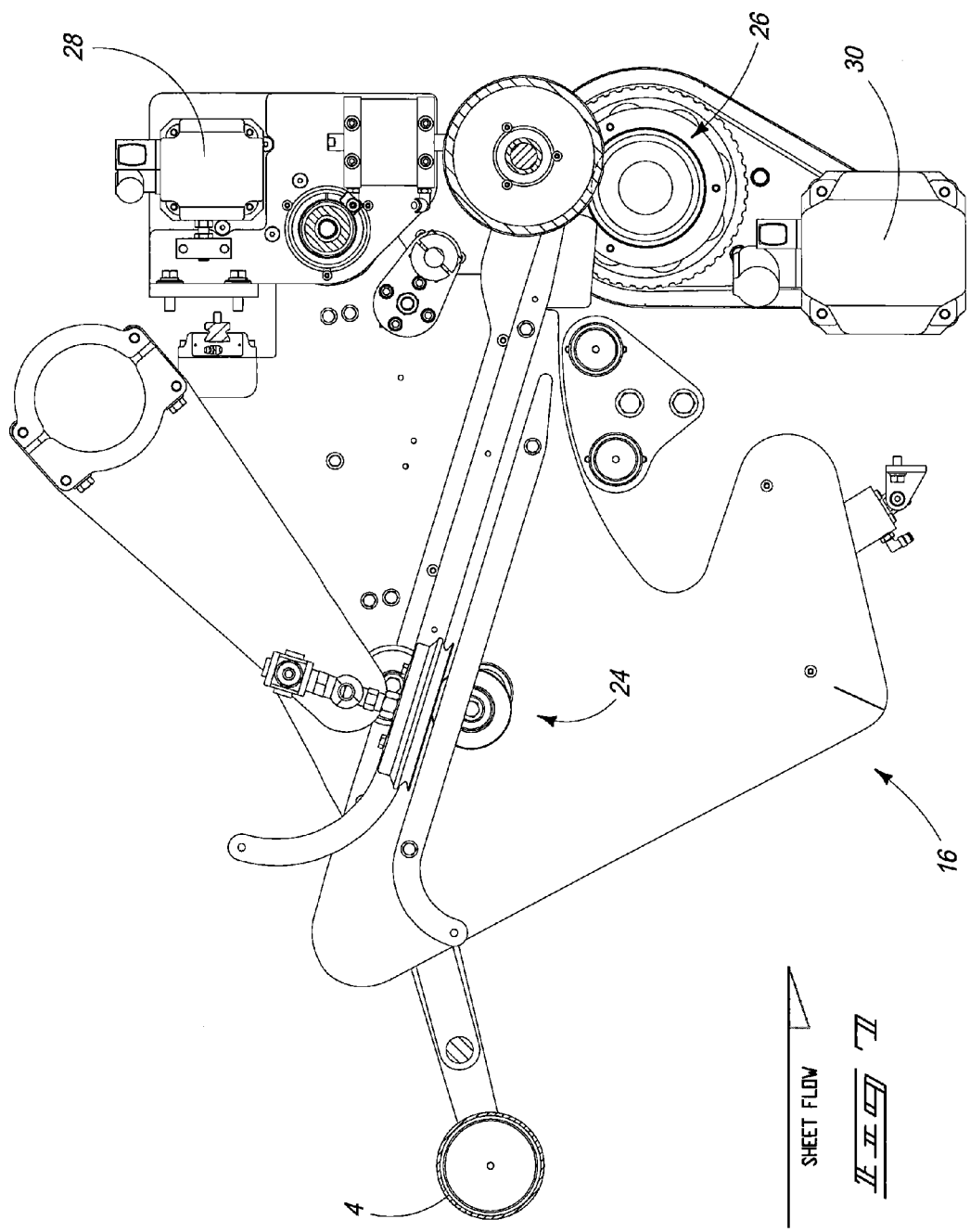
FIG. 7 is a simplified partial and vertical sectional view taken in an opposite direction of the view in FIG. 6 of the pre-feed section for the web splicing apparatus of FIGS. 1-6.

FIG. 7 shows an arrangement of coacting pre-feed wheels 24 (provided on both lateral edges of an incoming sheet) driven by a prefeed motor 28 to drive a new sheet towards a nip/payout rollers assembly 26. Assembly 26 is driven in coacting relation via a payout motor 30. Assembly 26 can drive new and old sheets in forward and reverse directions, under computer control. Motors 28 and 30 are computer driven servo motors capable of being controlled by computer commands via control system 13 (of FIG. 3).

According to one construction, prefeed motor 28 of FIG. 7 is a Siemens servo motor Model No. 1FK7043-7AK71-1DA3. Payout motor 30 of FIG. 7 is a Siemens servo motor Model No. 1FK7085-7AF71-1DA3. Furthermore, tilt motor 32 (see FIG. 32) is a Siemens servo motor Model No. 1FK7043-7AK71-1DA3 and splice align motor (for sheet thickness) 34 is a Siemens servo motor Model No. 1 FK7043-7AK71-1DA3. Finally, hot wire motor 36 (see FIG. 36) is a Siemens servo motor Model No. 1FK7043-7AK71-1DA3. These servo motors are available commercially in the USA through Siemens Johnson City—SIAC, One Internet Plaza, Johnson City, Tenn. 37604, USA.

Figure 8:
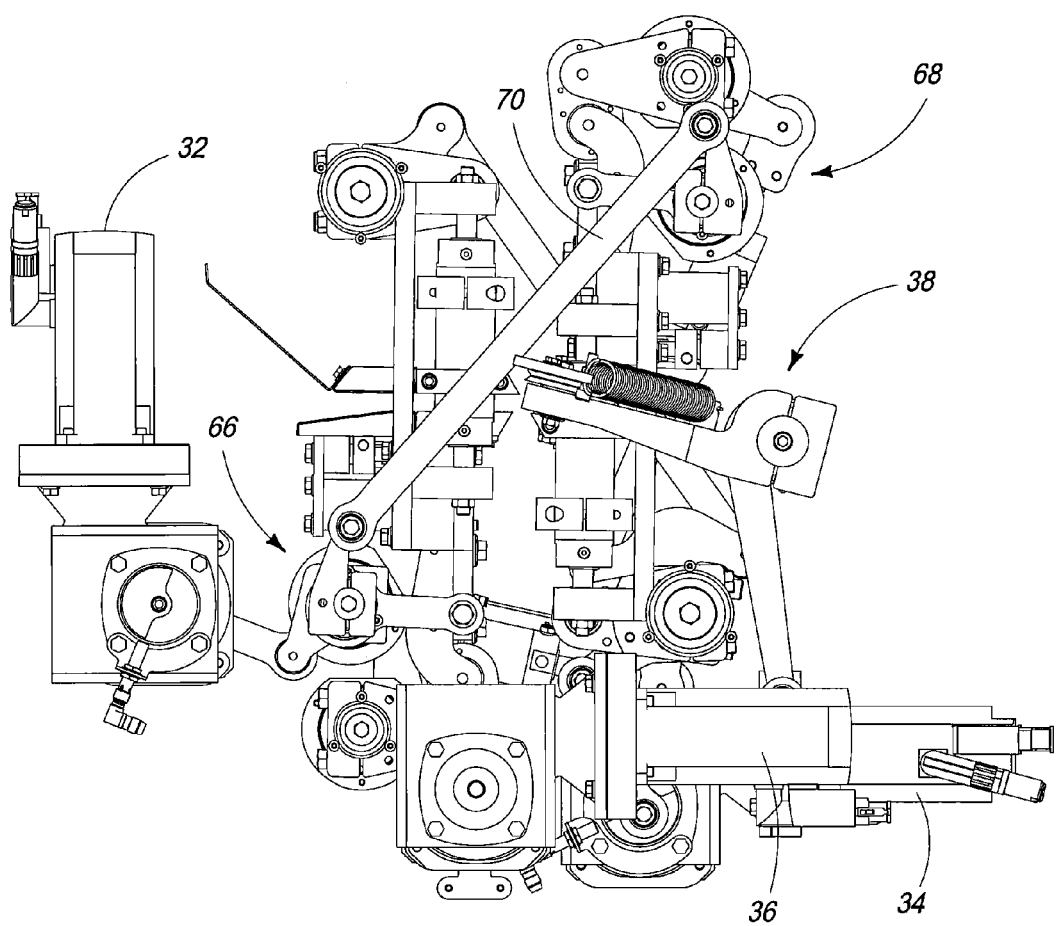
FIG. 8 is a simplified partial and vertical side view of the splice section assembly for the web splicing apparatus of FIGS. 1-6.
Figure 30:
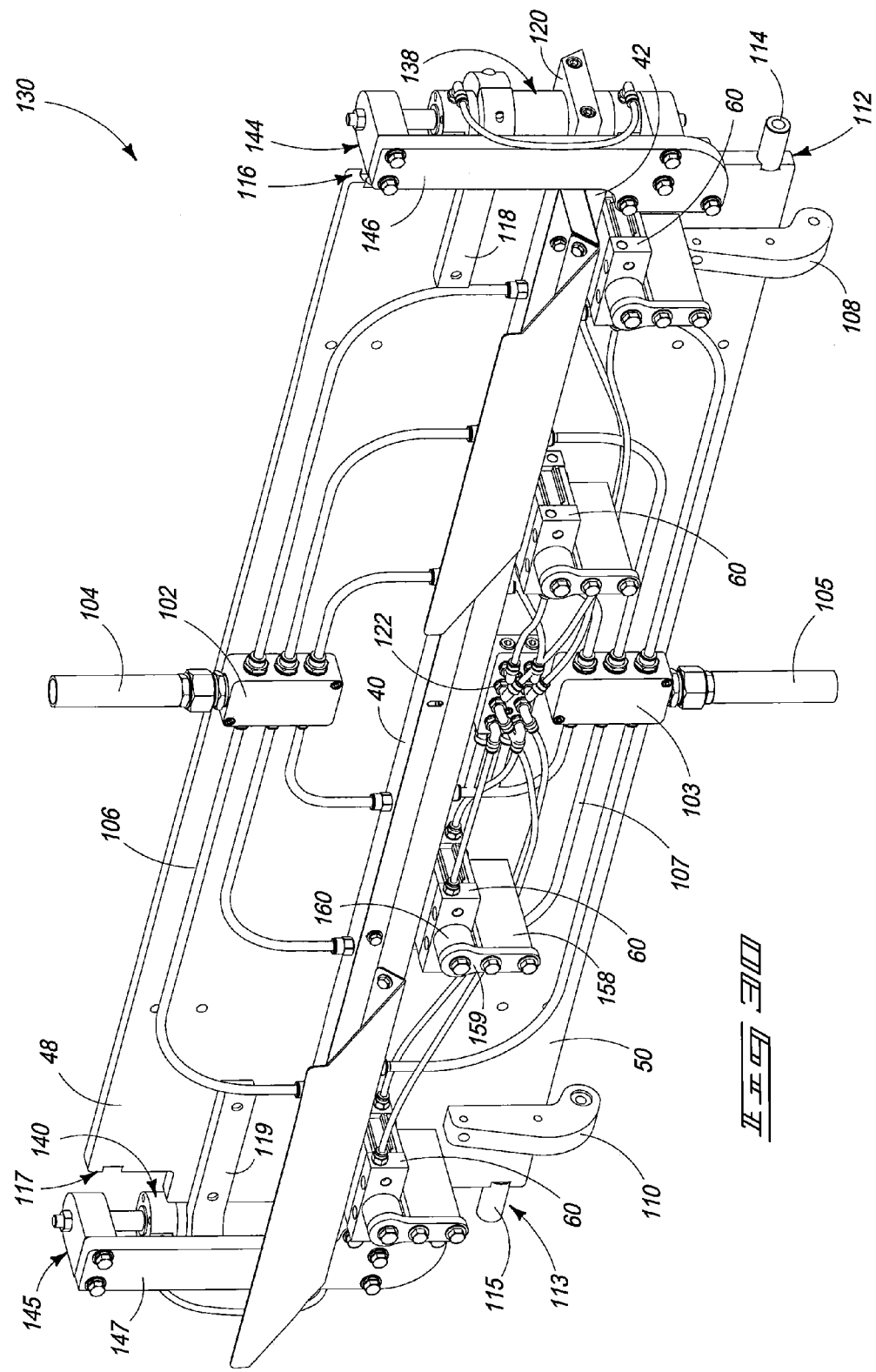
FIG. 30 is an enlarged component perspective view of an entrance vacuum bar assembly of FIGS. 6 and 9.
Figure 31:
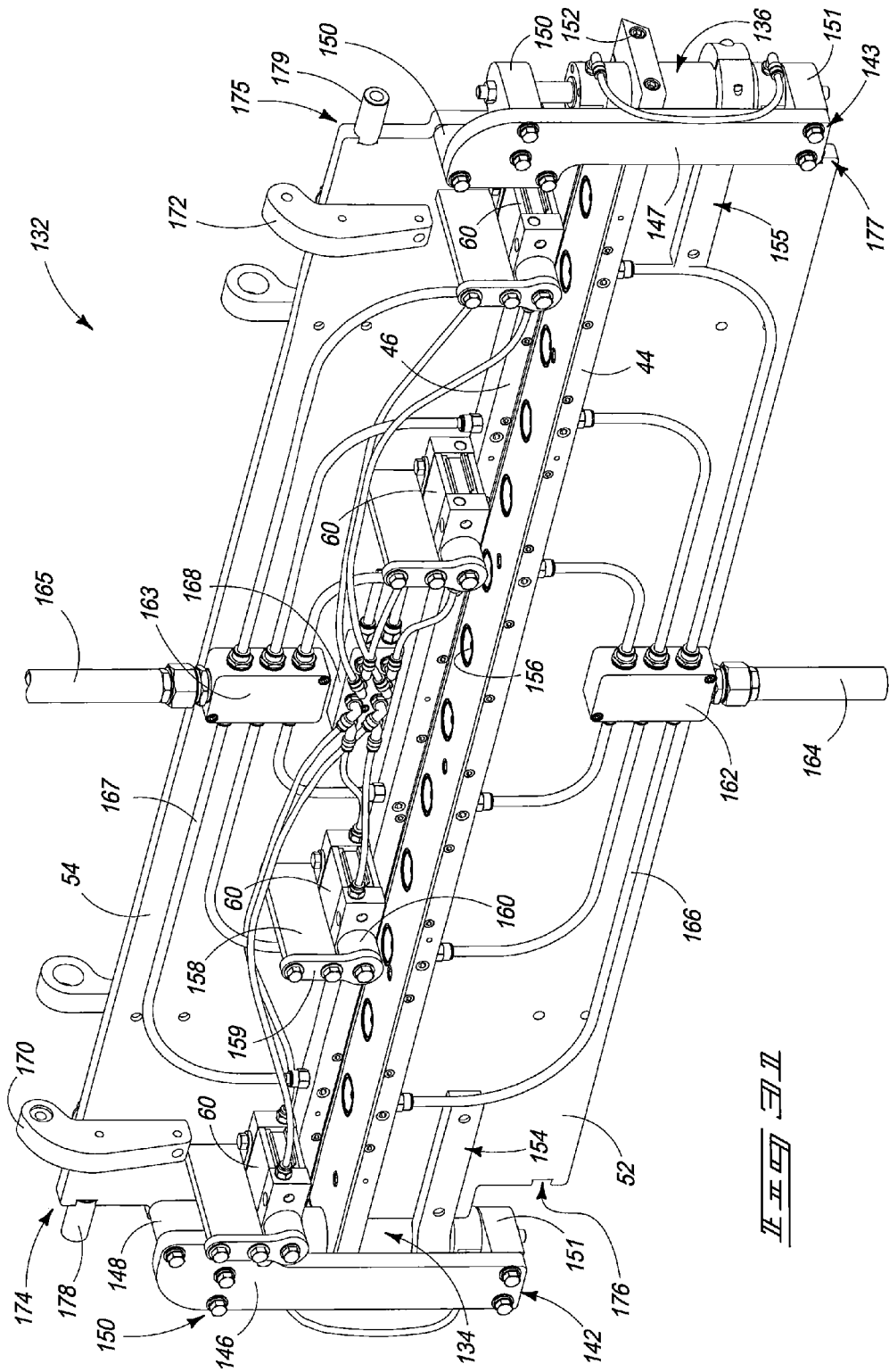
FIG. 31 is an enlarged component perspective view of an exit vacuum bar assembly of FIGS. 6 and 9.

FIG. 8 illustrates the splice section assembly 20 from a side opposite to that shown in FIG. 7. Further component details are shown in FIGS. 30 and 31 below. More particularly, a tilt motor 32 drives a pair of splice tilt mechanisms 66 and 68 that are coupled together via a cross bar 70 that links identical, but opposed articulating motions between the two mechanisms 66 and 68. A hot wire web cutting mechanism 38 supports an electrically resistive heated hot wire between a pair of end spools for severing and heating webs of thermoformable material that the wire is articulated through via upward and downward pivotal motion of hot wire web cutting mechanism 38. Hot wire web cutting mechanism 38 is driven up and down along a large arc via a hot wire motor 36. Further details of hot wire web cutting mechanism 38 are shown below with reference to FIG. 34. A splice alignment motor 34 adjusts one side of the splice section assembly 20 in elevational height as depicted below by FIG. 23.

Figure 9:
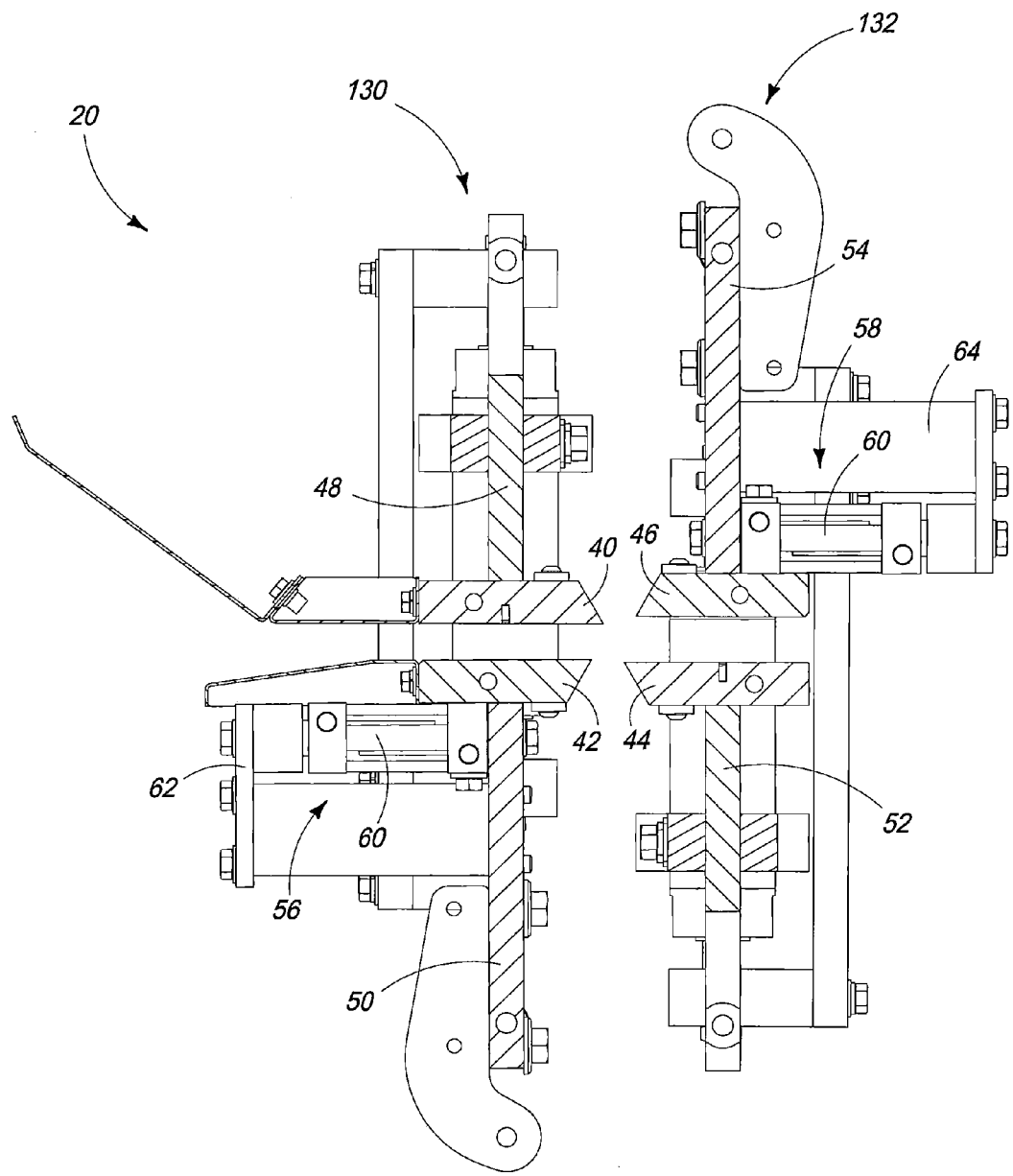
FIG. 9 is a simplified component view of the servo bars and clamp bars of the splice section of FIG. 8.

FIG. 9 illustrates further details of the splice section assembly 20. More particularly, an upstream clamp assembly is formed by a servo bar 40 and a clamp bar 42. A downstream clamp assembly is formed by a servo bar 44 and a clamp bar 46. Bars 40, 42, 44 and 46 are each elongate, rectangular bars that have an internal vacuum manifold that feeds an array of vacuum ports along respective bottom and top edges that contact a sheet of thermoformable material to hold the material. Vacuum bar stiffener plates 48, 50, 52 and 54 support and stiffen bars 40, 42, 44 and 46, respectively. A supply of vacuum is selectively applied and released to/from bars 40, 42, 44 and 46 in order to retain and release, respectively, a section of sheet during a splicing operation.

As shown in FIG. 9, a pair of lateral retraction assemblies 56 and 58 are supported by frames 62 and 64, respectively, for laterally retracting clamp bars 42 and 46 away from a splice line. Hence, clamp bars 42 and 46 are designed to hold sheet scrap ends during a splicing operation, and assemblies 56 and 58 each comprises a series of pneumatic cylinders 60 that retract and extend bars 42 and 46 during a splicing operation.

Figure 10:
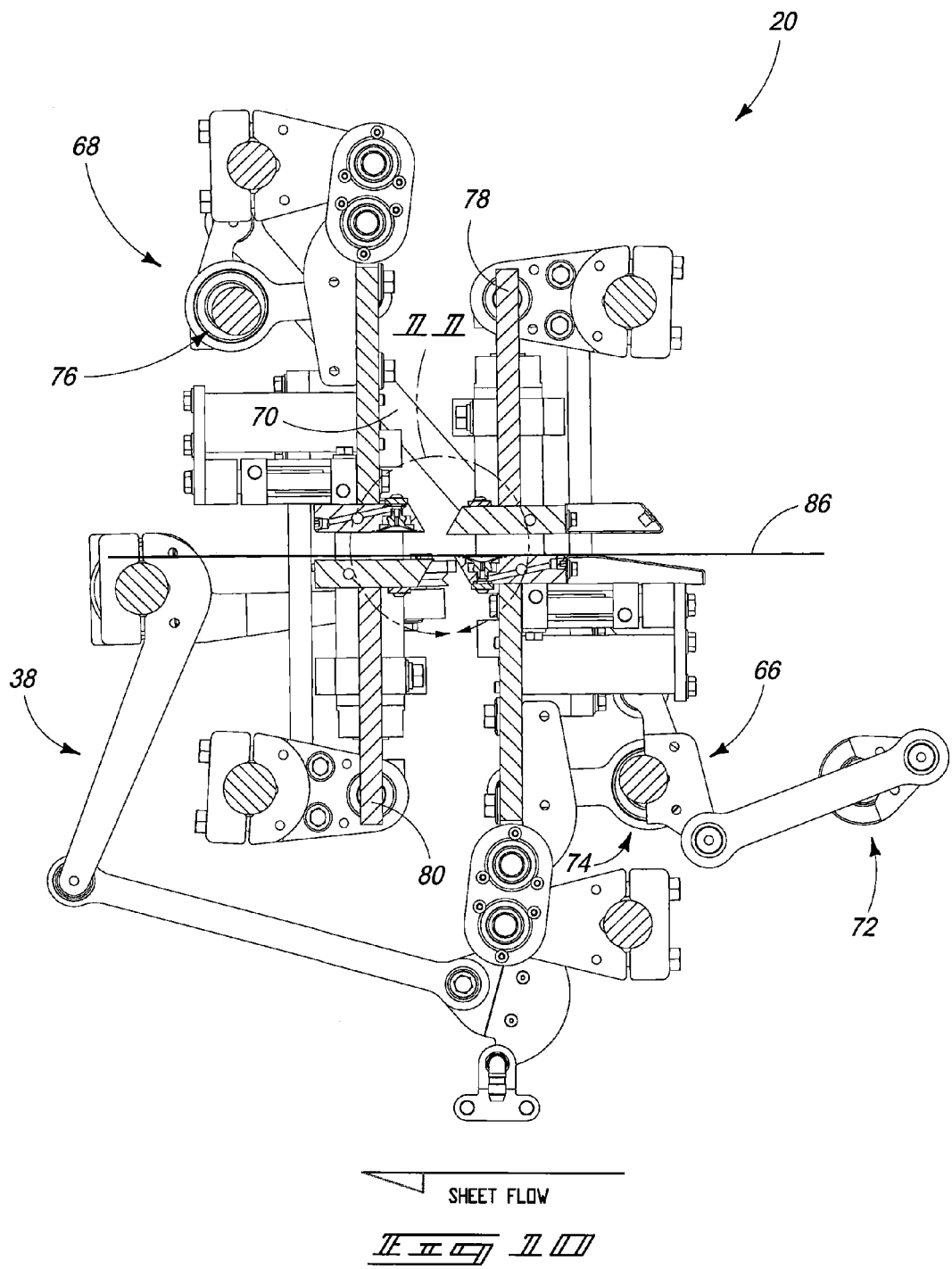
FIG. 10 is a vertical sectional view of selected splicer section components corresponding with a sheet payout mode.

FIG. 10 is a vertical sectional view of selected splicer section components of splicer section assembly 20 corresponding with a sheet payout mode where a terminating end of old thermoformable sheet 86 needs to be spliced onto a leading end of a new thermoformable sheet (not shown yet).

Figure 11:
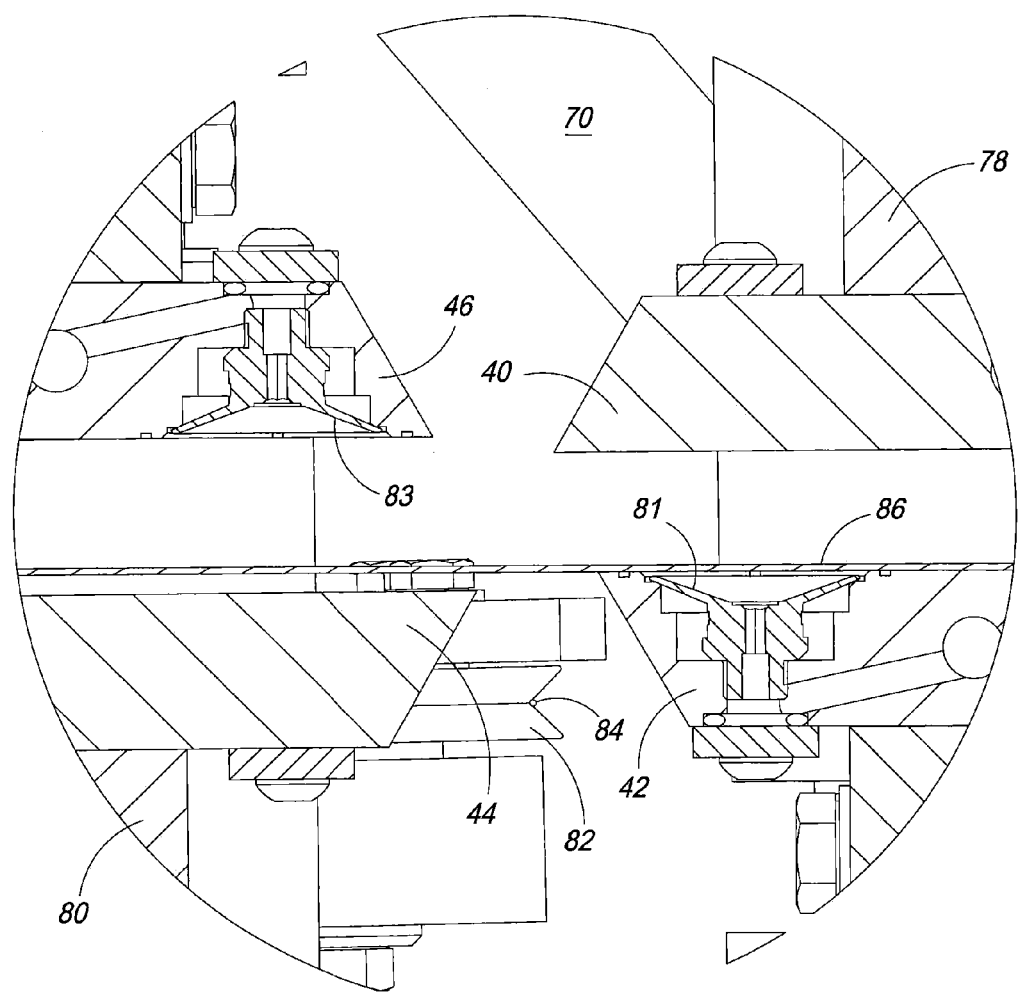
FIG. 11 is an enlarged view taken from the encircled region 11 of FIG. 10.

FIG. 11 is an enlarged view taken from the encircled region 11 of FIG. 10 showing details of sheet 86 and the clamp bars and servo bars during a sheet payout mode while thermoforming sheet 86, prior to running out of sheet 86. Splice tilt mechanisms 66 and 68 are shown coupled together for motion via cross-bar 70. A tilt drive linkage, or crank 72 is driven by the tilt motor (not shown) to drive eccentric links 74 and 76 to tilt each respective pair of servo bars and clamp bars about a respective pivot point 78 and 80, respectively. The tilt causes movement toward and away of webs captured by the servo and clamp bars relative to the other set of servo and clamp bars. This can be used to urge together the heated seam on the old and new webs so as to push them together during heating and fusing of the two edges.

Hot wire web cutting mechanism 38 includes a pair of arms that are clamped onto a pivot shaft in spaced apart relation. Each arm, at a radial end, supports a ceramic wheel with a conductive hot wire stretched between the wheels. The wire is raised and lowered to cut through sheets 86 and 88 and to heat severed ends of the sheets during a splicing operation, as described below. Mechanism 38 is driven in reciprocation by the hot wire motor. Optionally, a cutting wheel or blade (such as a carbide blade) can be provided on a linear track (supported by the frame) in order to cut the old and new sheets, and mechanism 38 can be used solely to heat and splice together the two sheets. For example, solid plastic sheet can be cut with a rotating cutting wheel on a track, and mechanism 38 can be used to heat and splice together the two sheets. This modification would overcome the need for additional heat to quickly sever solid sheet, thereby potentially speeding up the operation.

Figure 12:
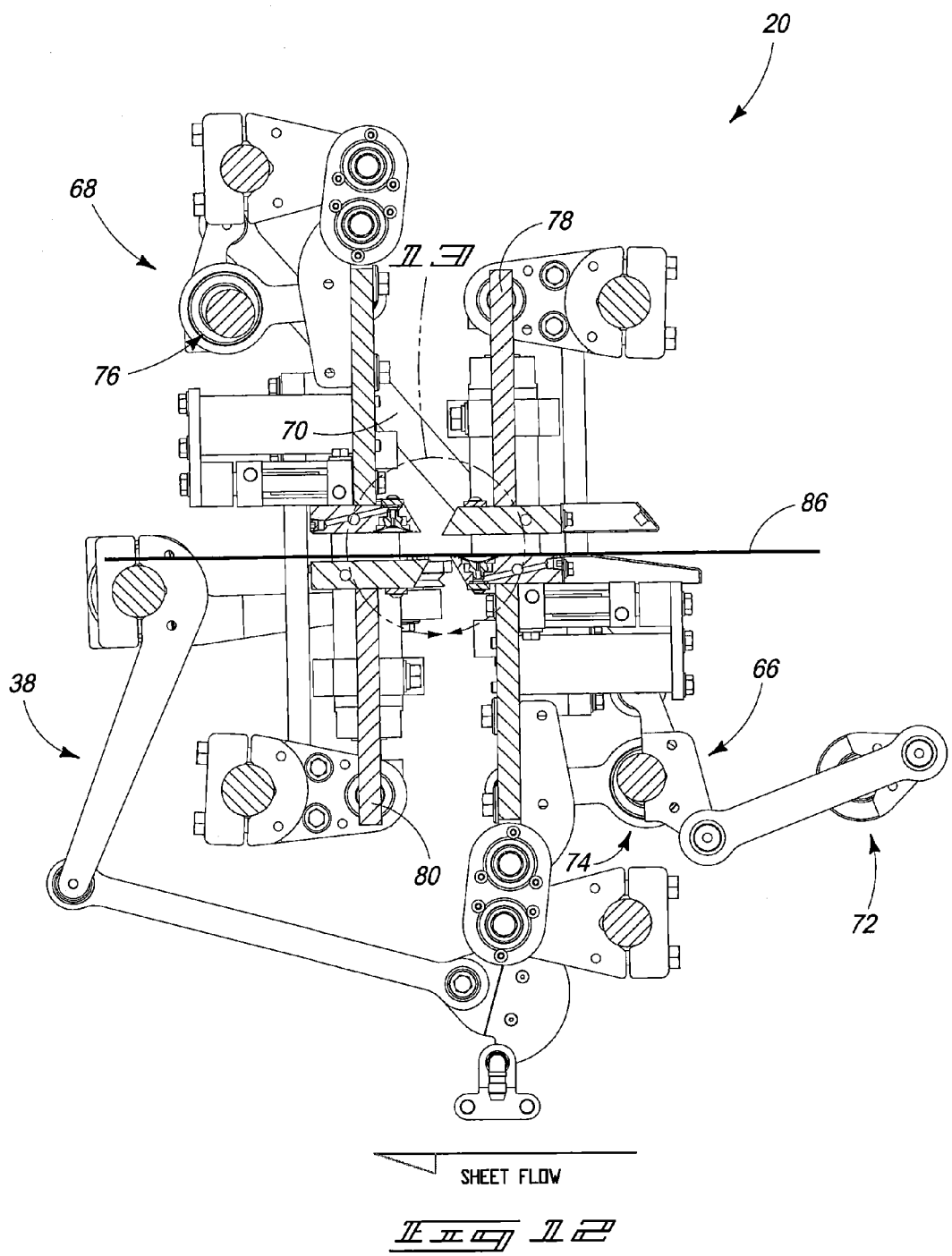
FIG. 12 is a vertical sectional view of selected splicer section components corresponding with a new sheet delivery mode.

FIG. 12 is a vertical sectional view of selected splicer section components corresponding with a new sheet delivery mode. More particularly, a leading end of a new sheet is overlapping old sheet 86 prior to being spliced together. FIGS. 12 through 29 occur sequentially.

Figure 13:
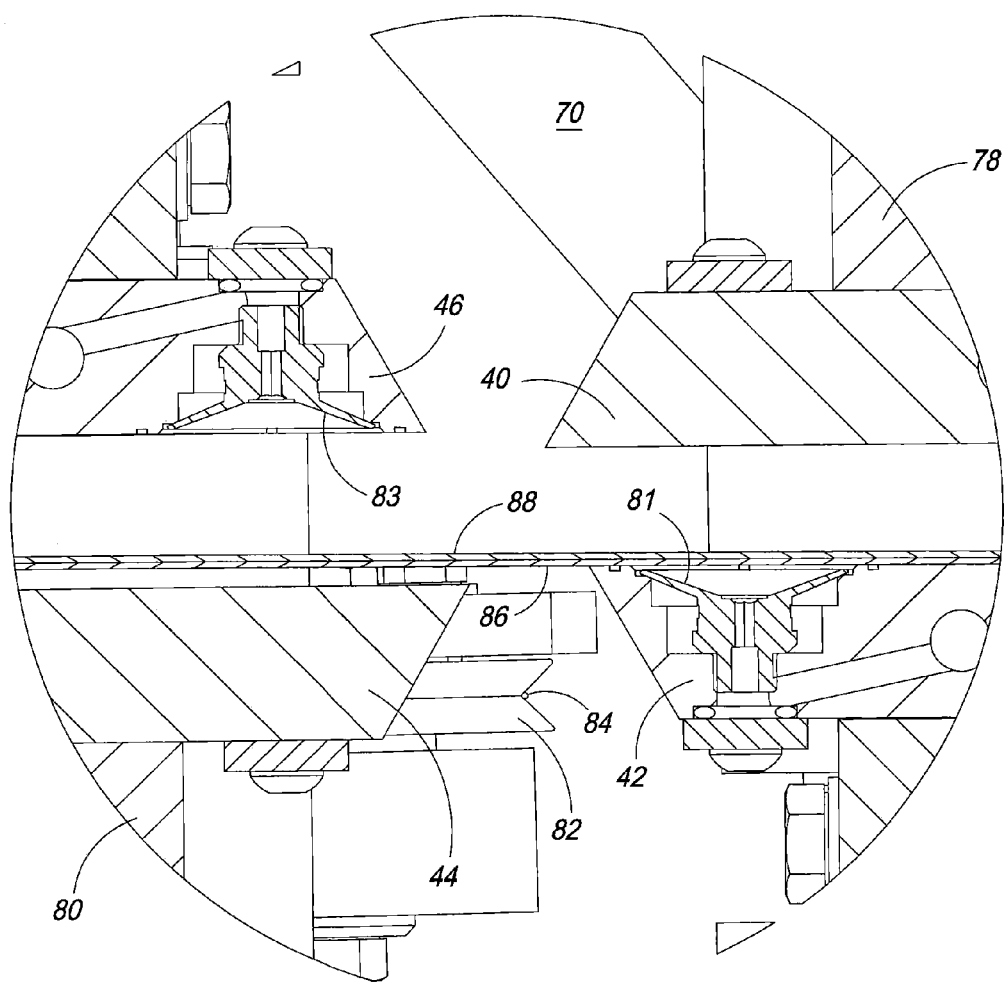
FIG. 13 is an enlarged view taken from the encircled region 13 of FIG. 12.

FIG. 13 is an enlarged view taken from the encircled region 13 of FIG. 12 showing a leading end of new sheet 88 lying atop a trailing end of old sheet 86. The hot wire 84 is provided below sheets 86 and 88.

Figure 14:
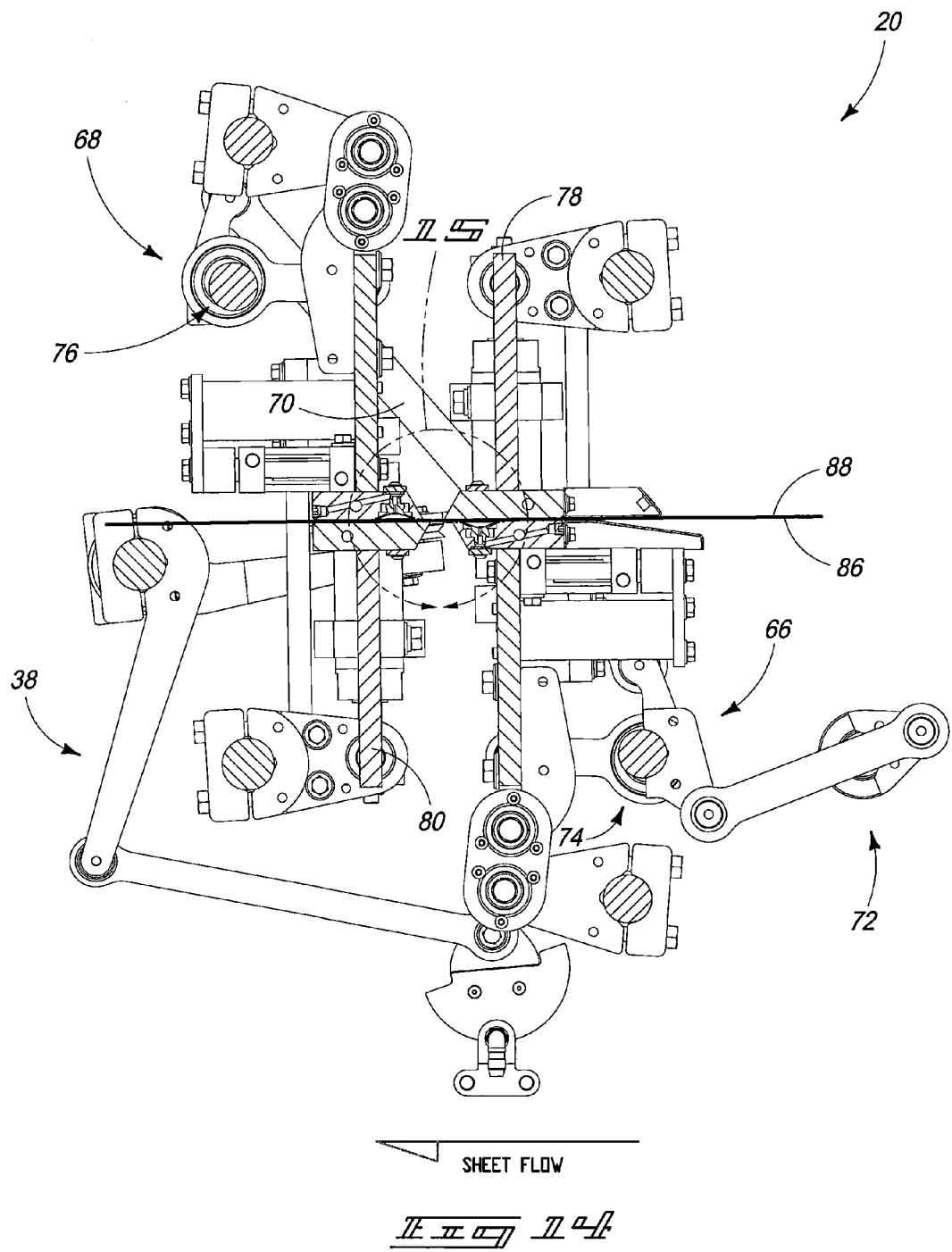
FIG. 14 is a vertical sectional view of selected splicer section components corresponding with a vacuum clamp mode.

FIG. 14 is a vertical sectional view of selected splicer section components corresponding with a vacuum clamp mode where both servo bars and clamp bars are driven into engagement with sheets 86 and 88, and a vacuum is applied to the sheets through vacuum ports in each bar 40, 42, 44 and 46 from the vacuum tank 22 (see FIG. 4).

Figure 15:
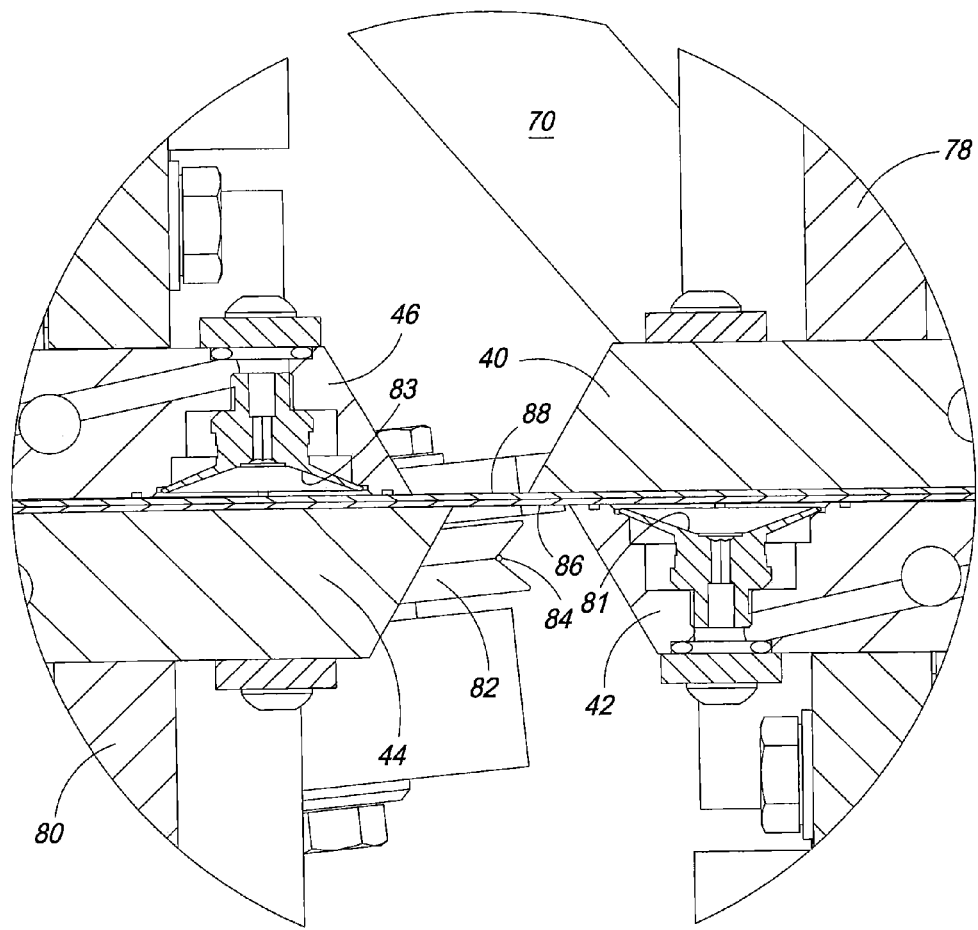
FIG. 15 is an enlarged view taken from the encircled region 15 of FIG. 14.

FIG. 15 is an enlarged view taken from the encircled region 15 of FIG. 14 showing the bars contacting sheets 86 and 88 and application of a vacuum to each from the respective bar.

Figure 16:
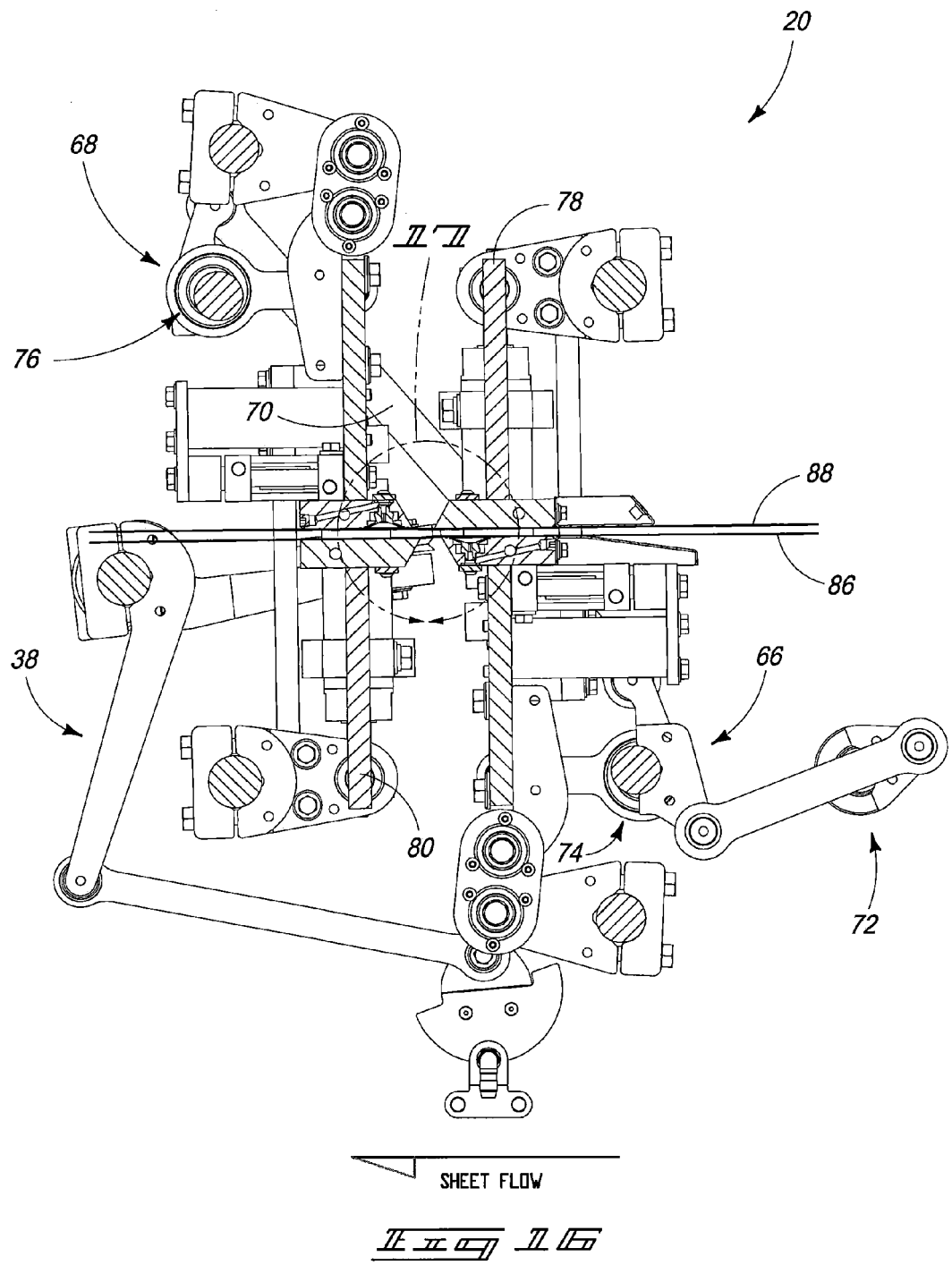
FIG. 16 is a vertical sectional view of selected splicer section components corresponding with a sheet apart mode.

FIG. 16 is a vertical sectional view of selected splicer section components corresponding with a sheet apart mode. More particularly, servo motor 34 drives splice splice alignment mechanism 96 of FIG. 32 so as to articulate splice section assembly 20 and move the sheets apart vertically in order to provide a gap between the sheets 86 and 88. The gap prevents the hot, severed sheets from sticking with the adjacent scrap and adjacent sheet when the hot wire is driven through both sheets 86 and 88.

Figure 17:
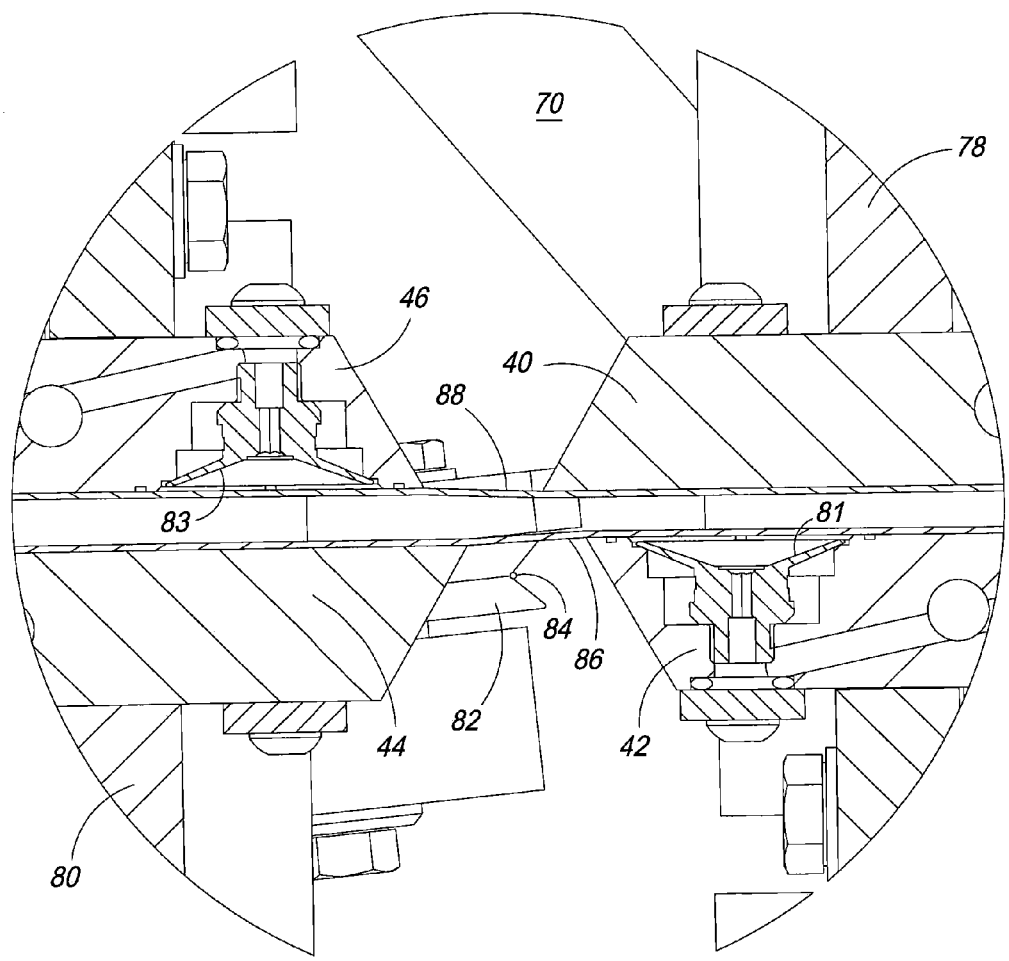
FIG. 17 is an enlarged view taken from the encircled region 17 of FIG. 16.

FIG. 17 is an enlarged view taken from the encircled region 17 of FIG. 16. Sheets 86 and 88 are separated prior to moving hot wire 84 up through the sheets, during the following step.

Figure 18:
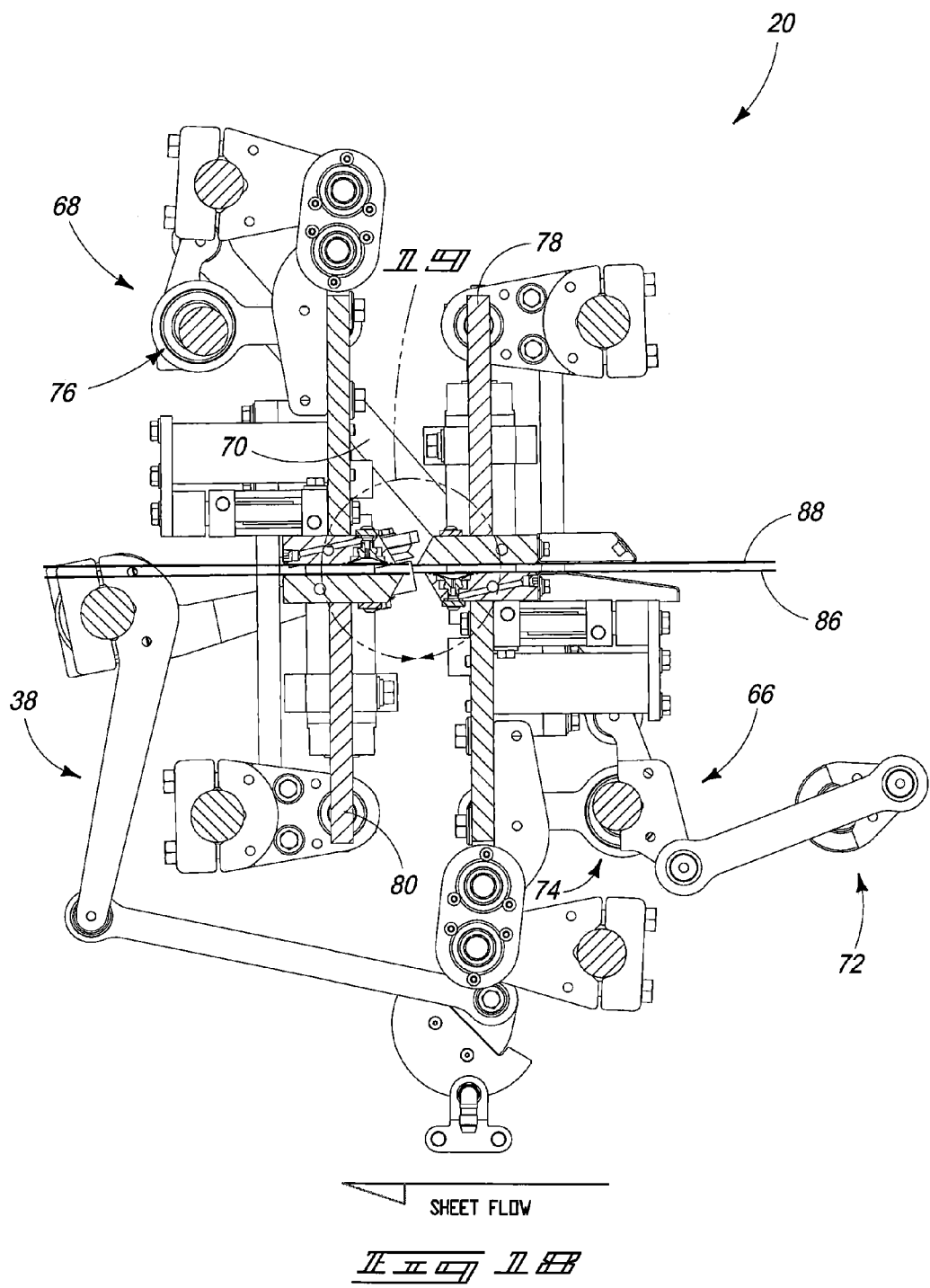
FIG. 18 is a vertical sectional view of selected splicer section components corresponding with a wire cut sheets mode.

FIG. 18 is a vertical sectional view of selected splicer section components corresponding with a wire cut sheets mode. Hot wire 84 has been heated (by electrical resistance) and raised through sheets 86 and 88, severing each sheet from adjacent scrap sheet.

Figure 19:
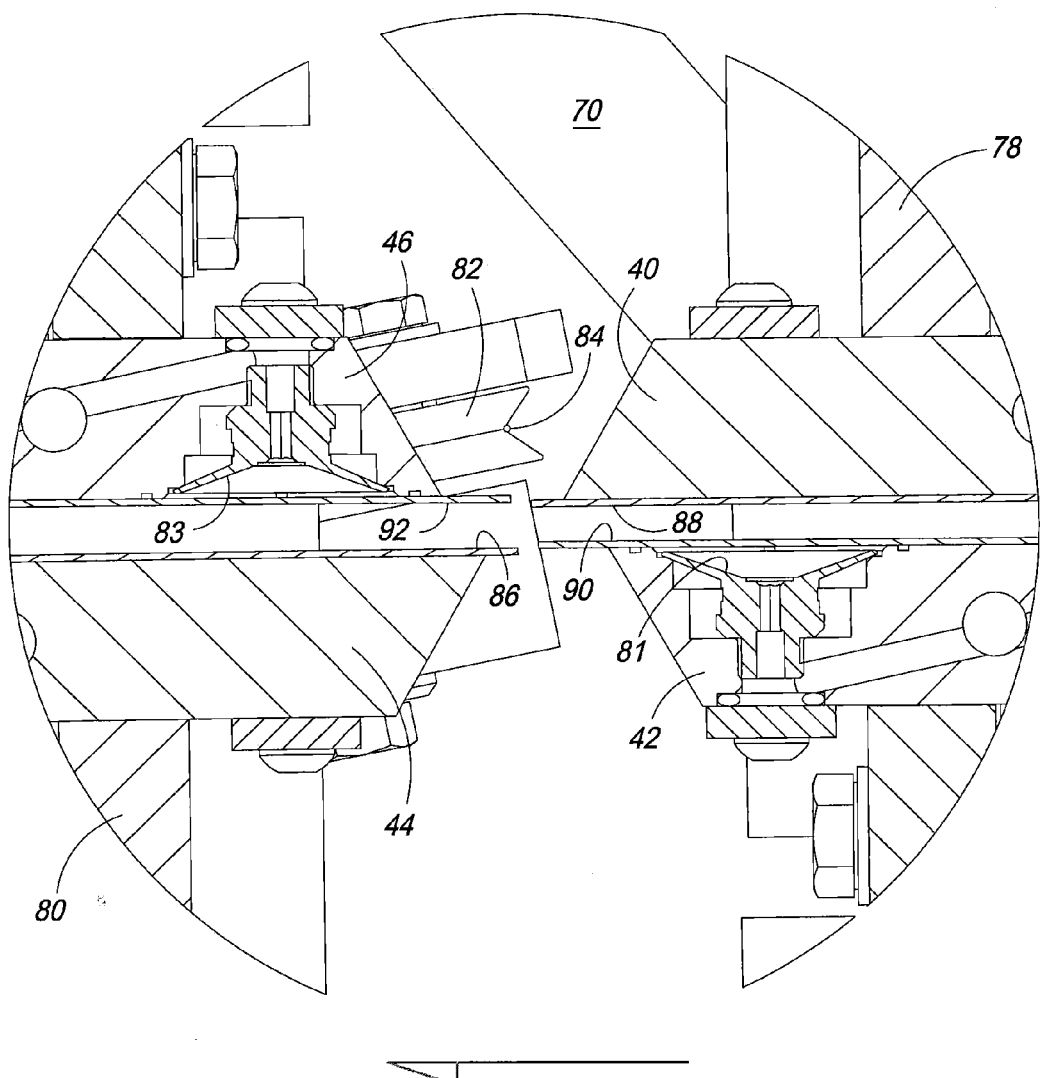
FIG. 19 is an enlarged view taken from the encircled region 19 of FIG. 18.

FIG. 19 is an enlarged view taken from the encircled region 19 of FIG. 18. A trailing scrap sheet 90 is severed from old sheet 86 and a leading scrap sheet 92 is severed from a new sheet 88. Hot wire 84 has been moved to a raised position, above sheets 86 and 88, after severing sheets 86 and 88.

Figure 20:
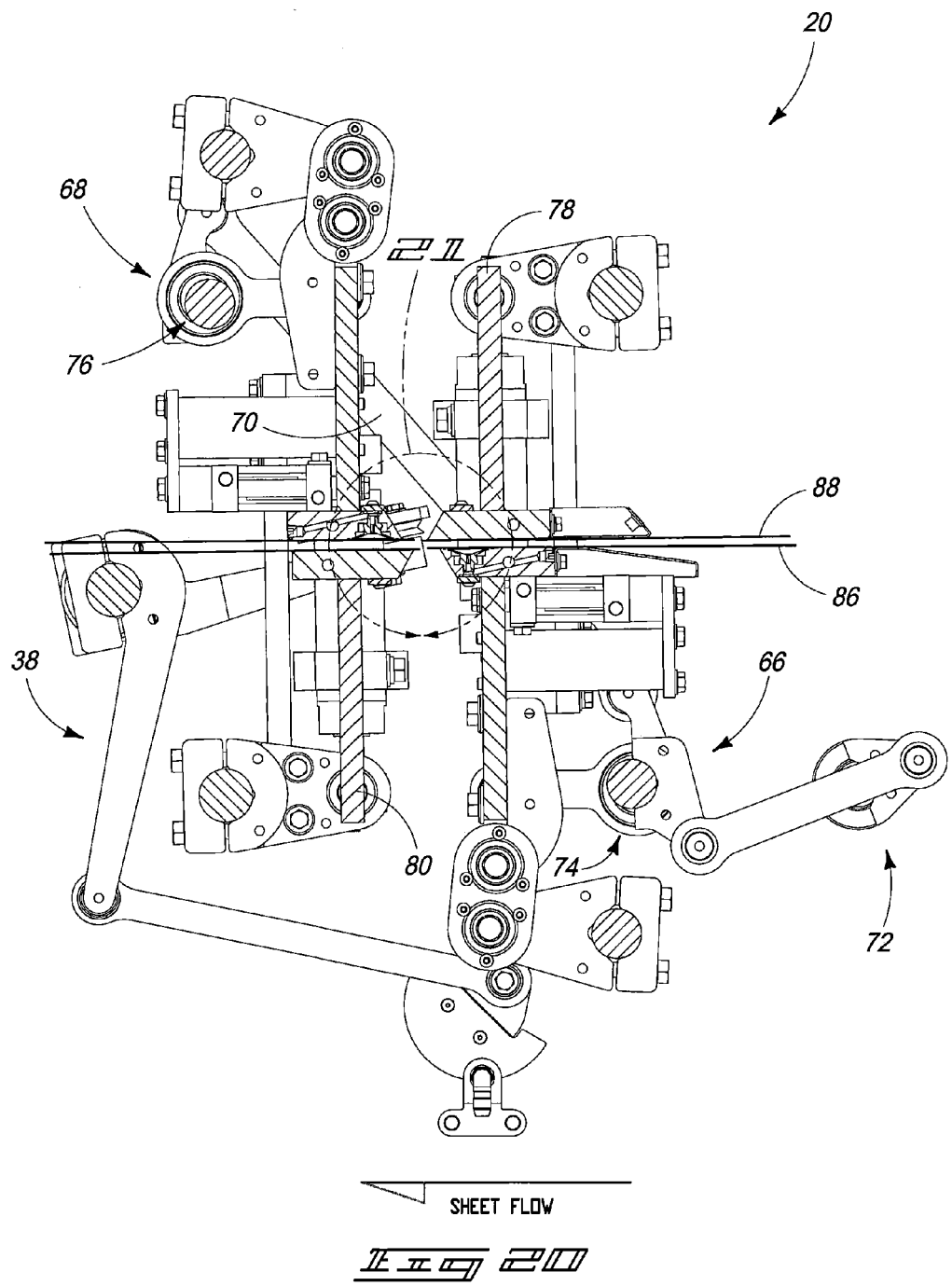
FIG. 20 is a vertical sectional view of selected splicer section components corresponding with a scrap retract mode.

FIG. 20 is a vertical sectional view of selected splicer section components corresponding with a scrap retract mode. The clamp bars and servo bars are holding each respective sheet via an applied vacuum while the respective pairs of servo bar and clamp bar are retracted laterally away from the other pair of servo bar and clamp bar.

Figure 21:
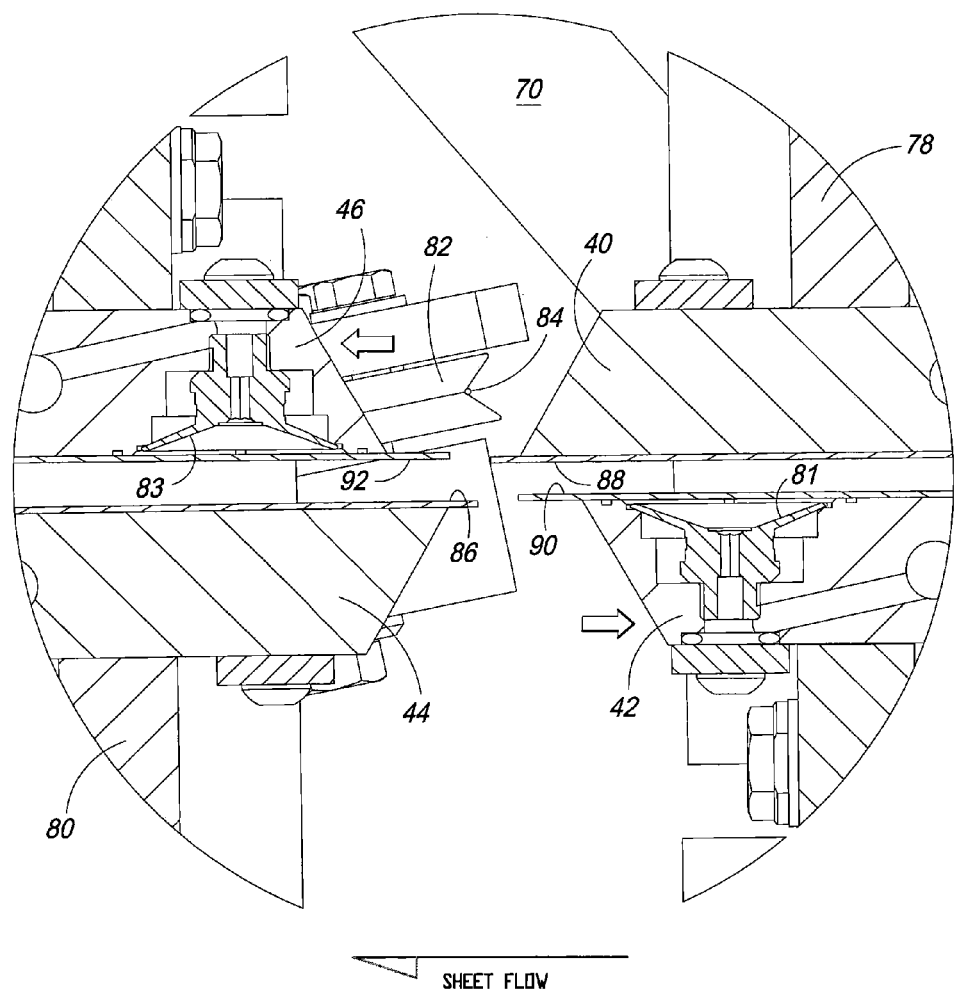
FIG. 21 is an enlarged view taken from the encircled region 21 of FIG. 20.

FIG. 21 is an enlarged view taken from the encircled region 21 of FIG. 20. The movement of clamp bars 42 and 46 moves the scrap sheets 92 and 90, respectively, away (retracts) from the region to be spliced between sheets 86 and 88.

Figure 22:
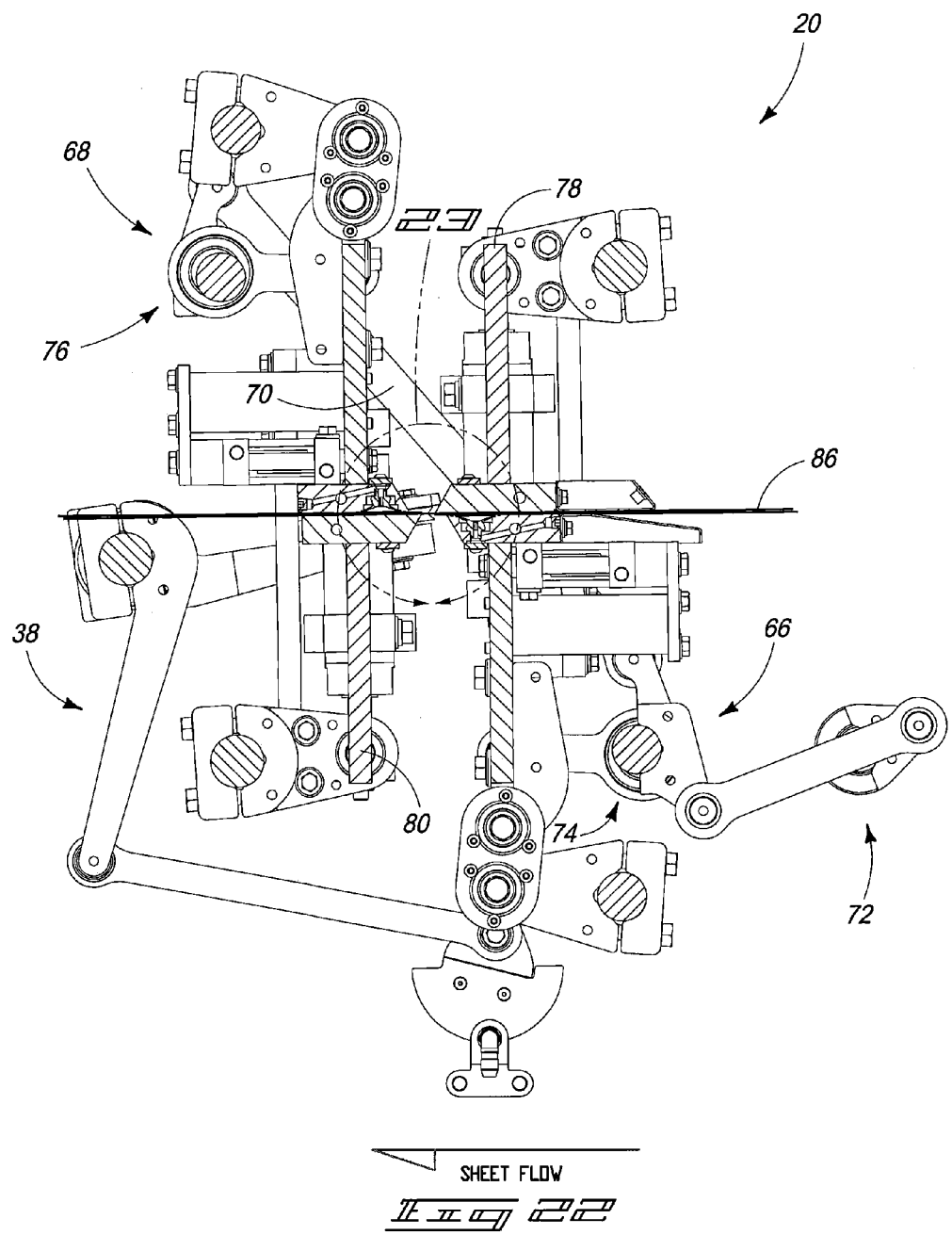
FIG. 22 is a vertical sectional view of selected splicer section components corresponding with an alignment mode.

FIG. 22 is a vertical sectional view of selected splicer section components corresponding with a sheet alignment mode.

Figure 23:
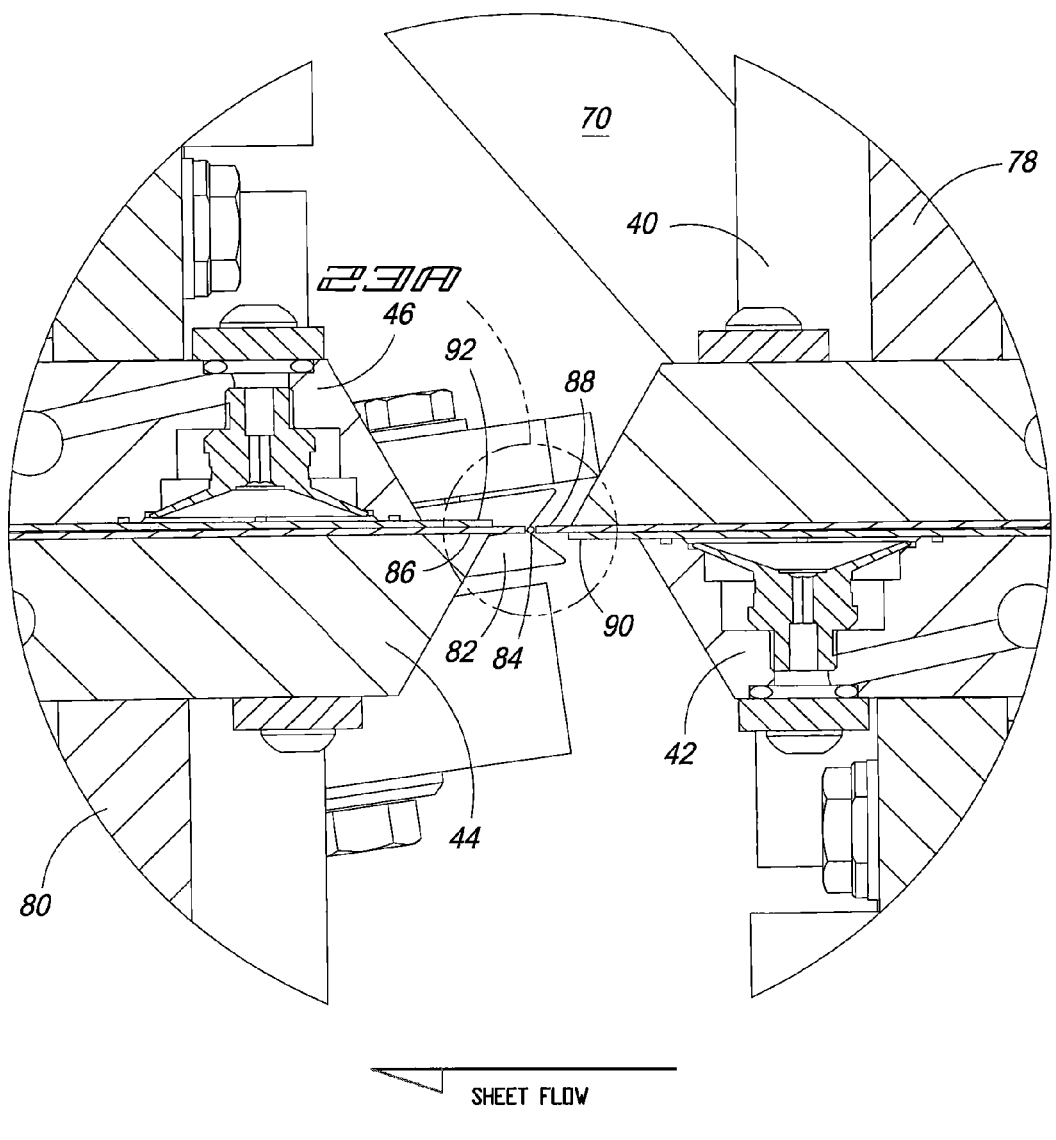
FIG. 23 is an enlarged view taken from the encircled region 23 of FIG. 22.

FIG. 23 is an enlarged view taken from the encircled region 23 of FIG. 22. Servo bars 40 and 44 are driven down and up, respectively, to bring sheets 86 and 88 into alignment. Bars 46 and 42 are supported on pneumatic cylinders, so they follow the position of bars 40 and 44. Hot wire 84 is now centered between the severed ends of sheets 86 and 88 where it applies heat to the severed edges.

Figure 23A:
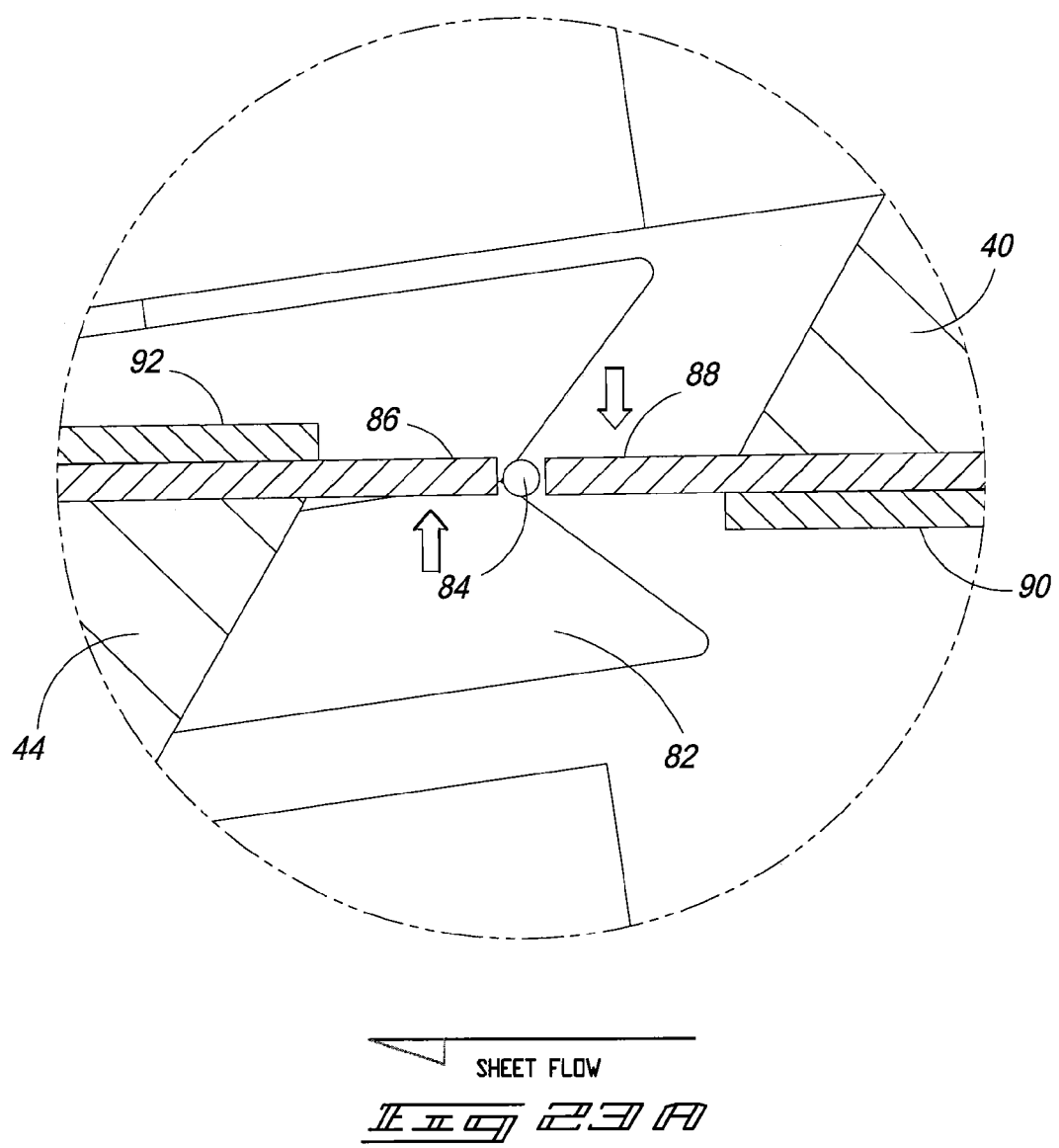
FIG. 23A is a further enlarged view taken from the encircled region 23A of FIG. 23.

FIG. 23A shows alignment of sheets 86 and 88 and positioning of wire 84. Splice alignment occurs using the mechanism of FIG. 33. Wire 84 is held here for a time (dwell delay that can be adjusted, depending on the sheet. Computer control via processing circuitry, memory and a program enables tailoring of the dwell time where motion is held still during the heating process.

FIG. 24 is a vertical sectional view of selected splicer section components corresponding with a sheet approach mode. During this stage, the heated wire dwell ends and the sheets 86 and 88 are moved closer together (using the splice tilt mechanism of FIG. 32).

Figure 25:
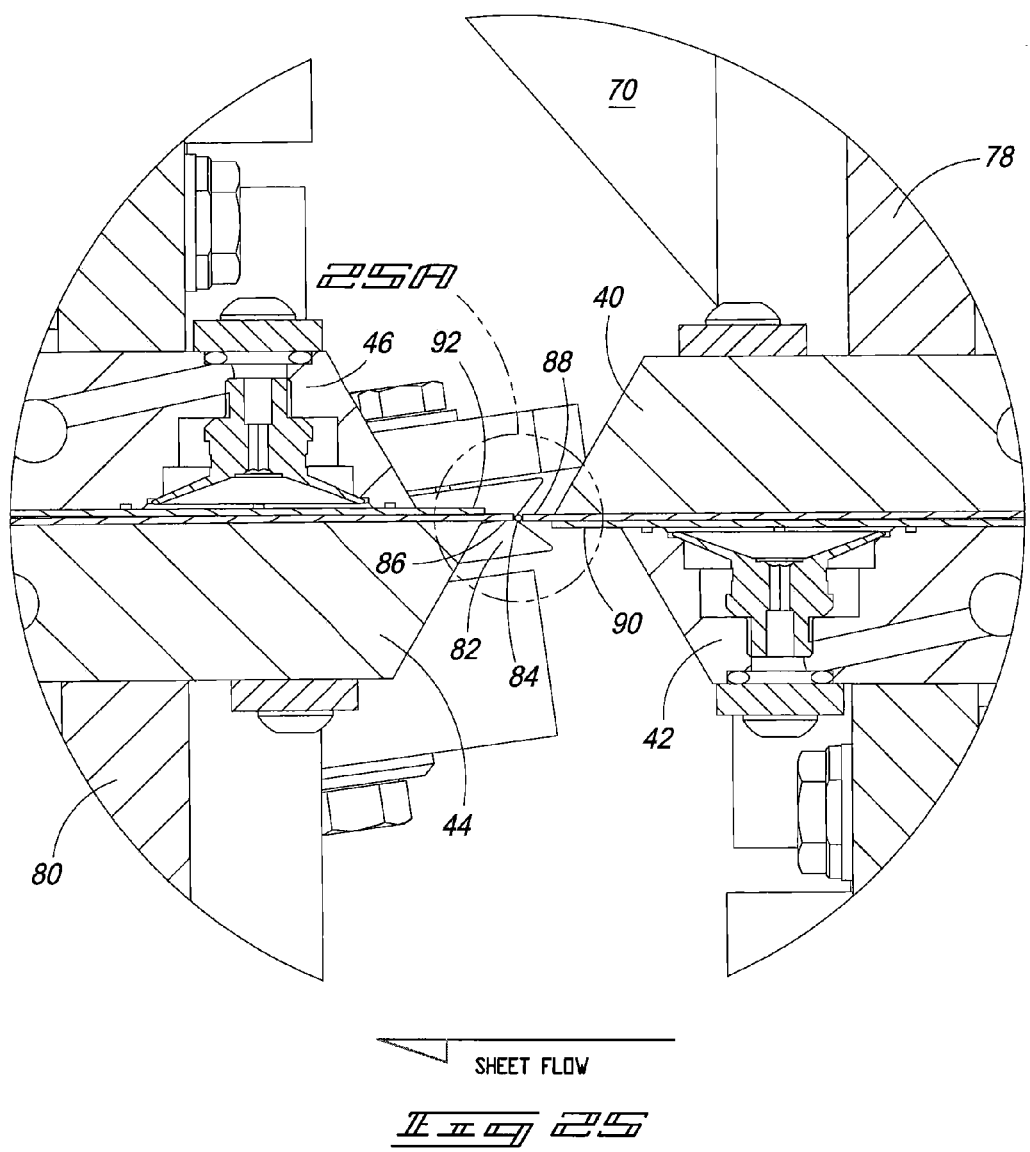
FIG. 25 is an enlarged view taken from the encircled region 25 of FIG. 24.
Figure 25A:
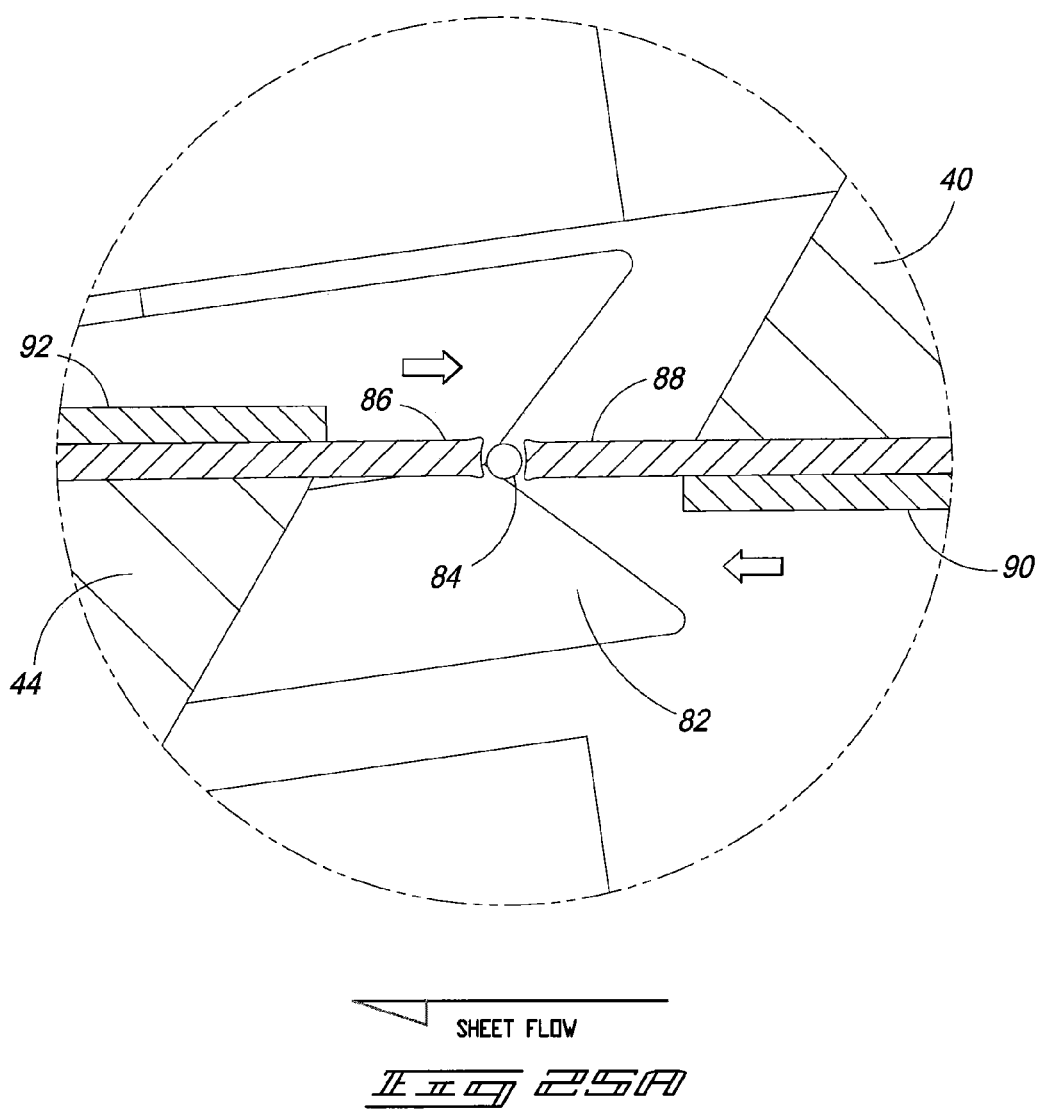
FIG. 25A is a further enlarged view taken from the encircled region 25A of FIG. 25.

FIGS. 25 and 25A provide enlarged views taken from the encircled region 25 of FIG. 24 and the encircled region 25A of FIG. 25, respectively. Sheets are brought closer together during heating by wire 84 as each clamp assembly is tilted so as to push the edges of sheets 86 and 88 closer together. During this step, wire 84 "dwells" between the edges of sheets 86 and 88, delivering heat thereto and generating a melted bead. FIG. 25B is taken later in time than the view of FIGS. 25 and 25A and depicts the further advancement together of the edges of sheet, building a melted bead or pool on each edge. During a "mashing" operation, it is presently believed (although not certain) that the melted beads on each edge intermix and join together to form a stronger splice because of the presence of the beads and the increased rate with which the "mash" operation of FIG. 27B is implemented. It is presently believed that the creation of these melted beads is somewhat analogous to formation of a welding bead when welding steel. The building of this bead in the steps of FIGS. 25A and 25B has been found through preliminary testing to generate a stronger and less brittle splice. The trailing terminal edge and the leading terminal edge are both heated with the heating element, or wire, sufficiently to impart melt-back of each edge away from the heating element at a melt-back rate. While heating the leading terminal edge and the trailing terminal edge, the leading terminal edge and the trailing terminal edge are each moved towards the heating element at a rate no greater than the melt-back rate so as to prevent contact of each edge with the heating element while maintaining proximity with the heating element to deliver heat to each edge. Additionally, the process that forms the bead edge on each sheet also straightens out the edge, eliminating any "mouth-shaped edge" caused during severing and resulting from sheet stresses.

FIG. 26 is a vertical sectional view of selected splicer section components corresponding with a wire withdraw and sheet load mode. During this mode, the wire is moved down and the sheets 86 and 88 are brought even closer together, pushing the heated edges together and fusing them into a single sheet with a splice 85 (see FIG. 29).

Figure 27:
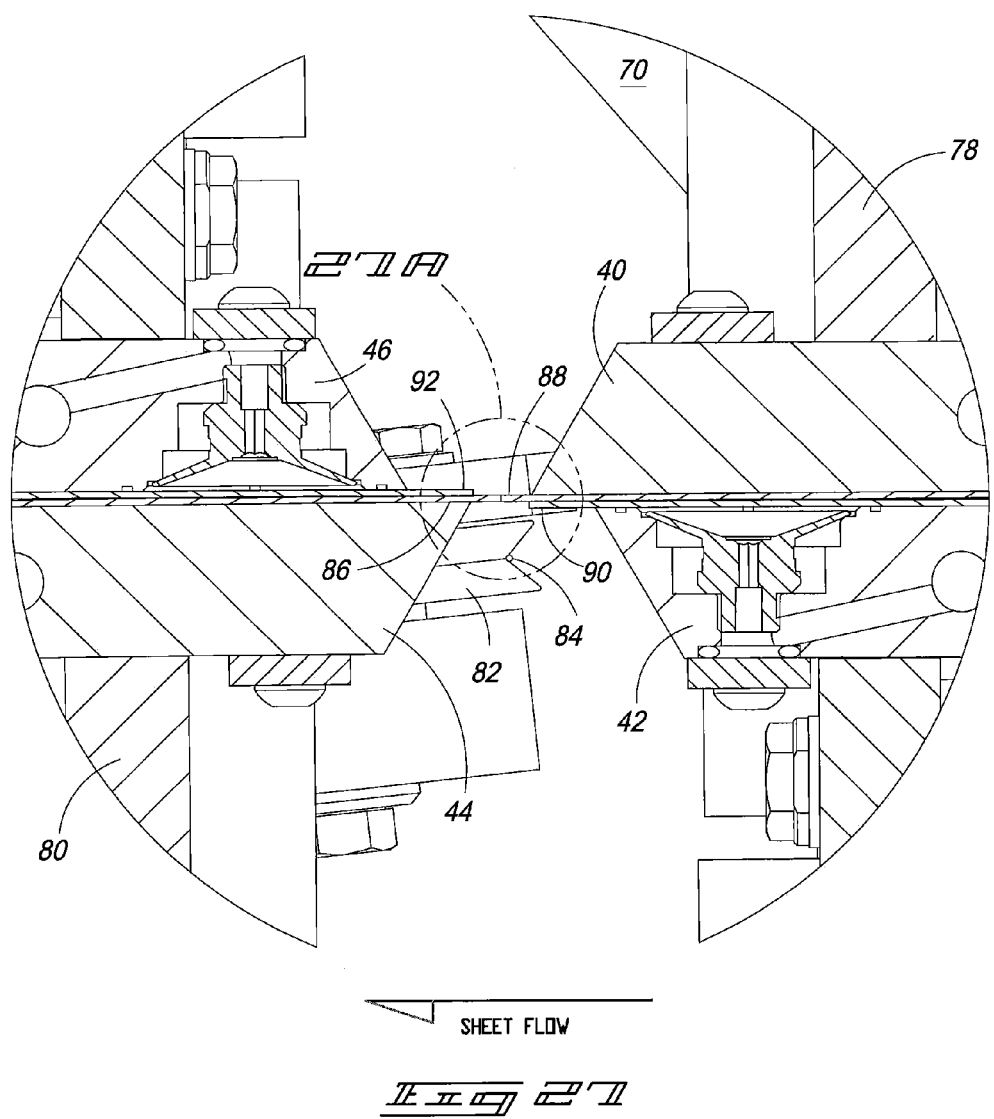
FIG. 27 is an enlarged view taken from the encircled region 27 of FIG. 26.
Figure 27A:
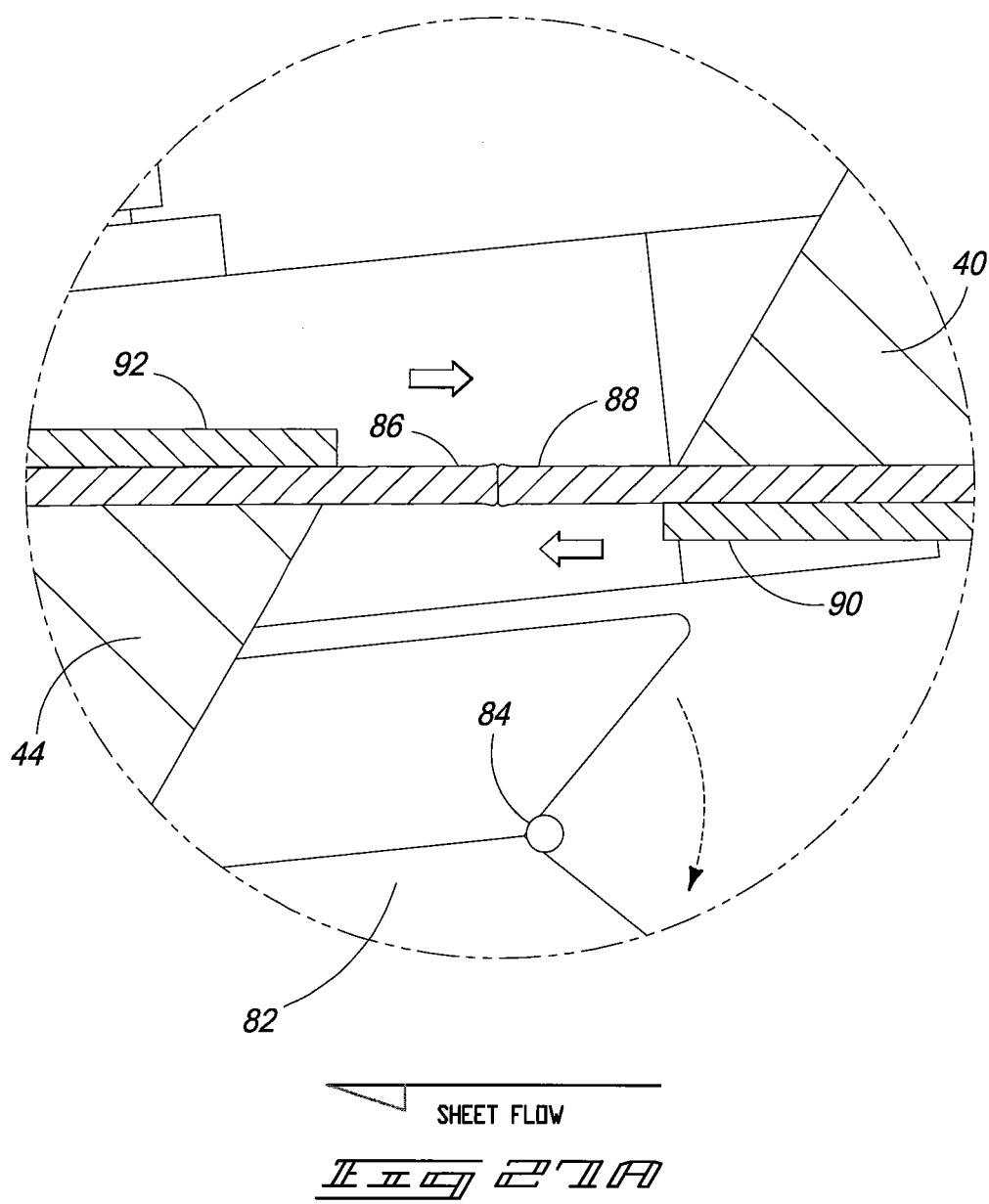
FIG. 27A is a further enlarged view taken from the encircled region 27A of FIG. 27.
Figure 27B:
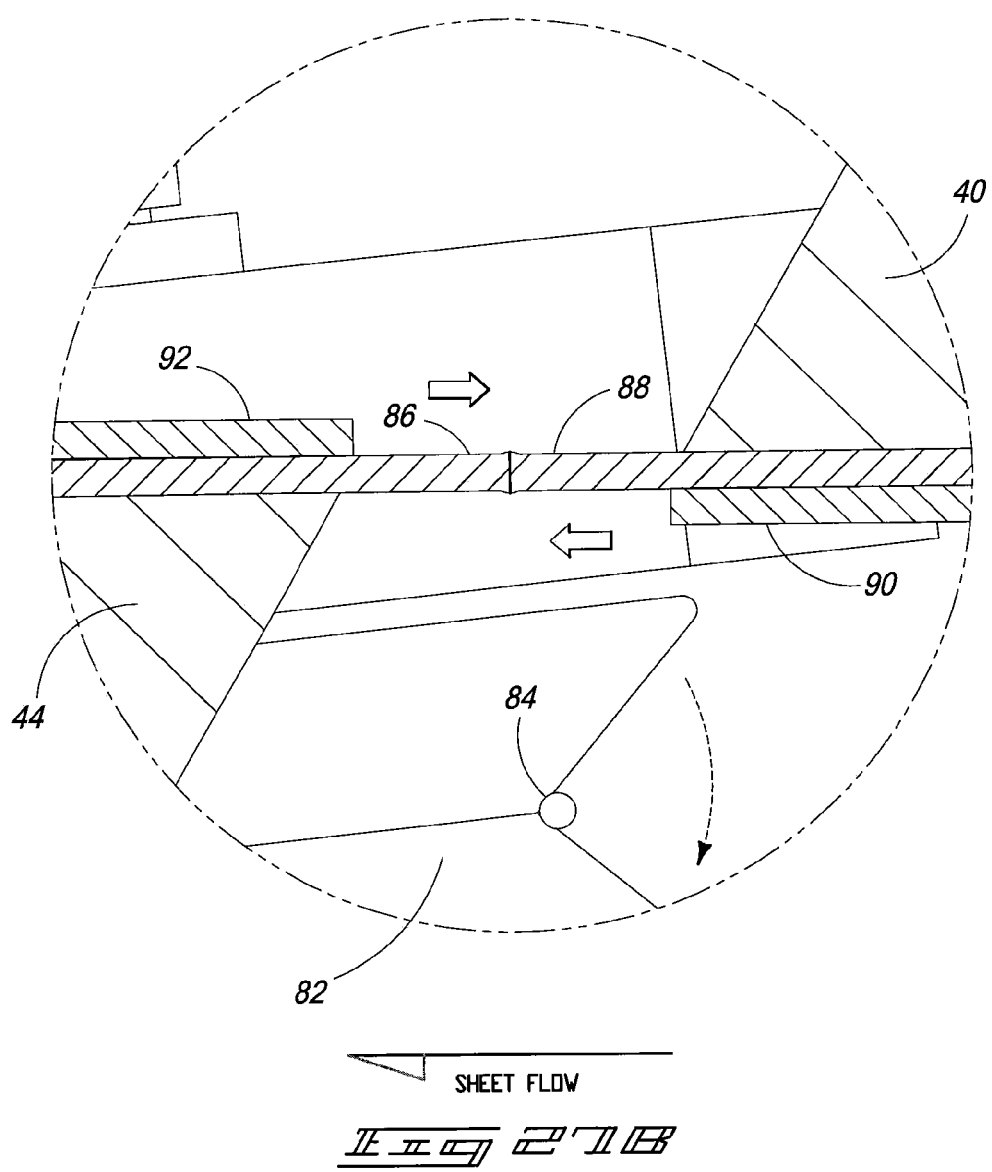
FIG. 27B is a further enlarged view taken from the encircled region 27A of FIG. 27, but taken later in time than FIG. 27A.

FIG. 27 is an enlarged view taken from the encircled region 27 of FIG. 26. Sheets 86 and 88 and being fused together by pressure and heat. FIG. 27A shows the ends of sheets 86 and 88 fusing together as servo bars 40 and 44 are rotated further together.

FIG. 27B occurs later in time than FIG. 27A and depicts a "mash" step where the heated ends of sheet are pushed together edge-wise at a higher rate (than in FIG. 25B), imparting greater fusing and increased strength and resilience to the resulting joining splice. As shown in FIGS. 25A and 25B, while heating the leading terminal edge and the trailing terminal edge, the leading terminal edge and the trailing terminal edge each move towards the heating element at a rate no greater than the melt-back rate so as to prevent contact of each edge with the heating element while maintaining proximity with the heating element to deliver heat to each edge. In the step of FIG. 27B, the rate with which the leading terminal edge and the trailing terminal edge are moved together is increased in order to fuse together the leading terminal edge and the trailing terminal edge as they cool to form a connection seam.

FIG. 28 is a vertical sectional view of selected splicer section components corresponding with a sheet apart and scrap withdrawal mode. During this mode, the fused together sheets 86 and 88 are run in reverse direction from the sheet flow direction, perhaps for several feet. Scrap 90 is ejected and dropped while a vacuum still holds scrap 92 for later removal by a machine operator or technician.

Figure 29:
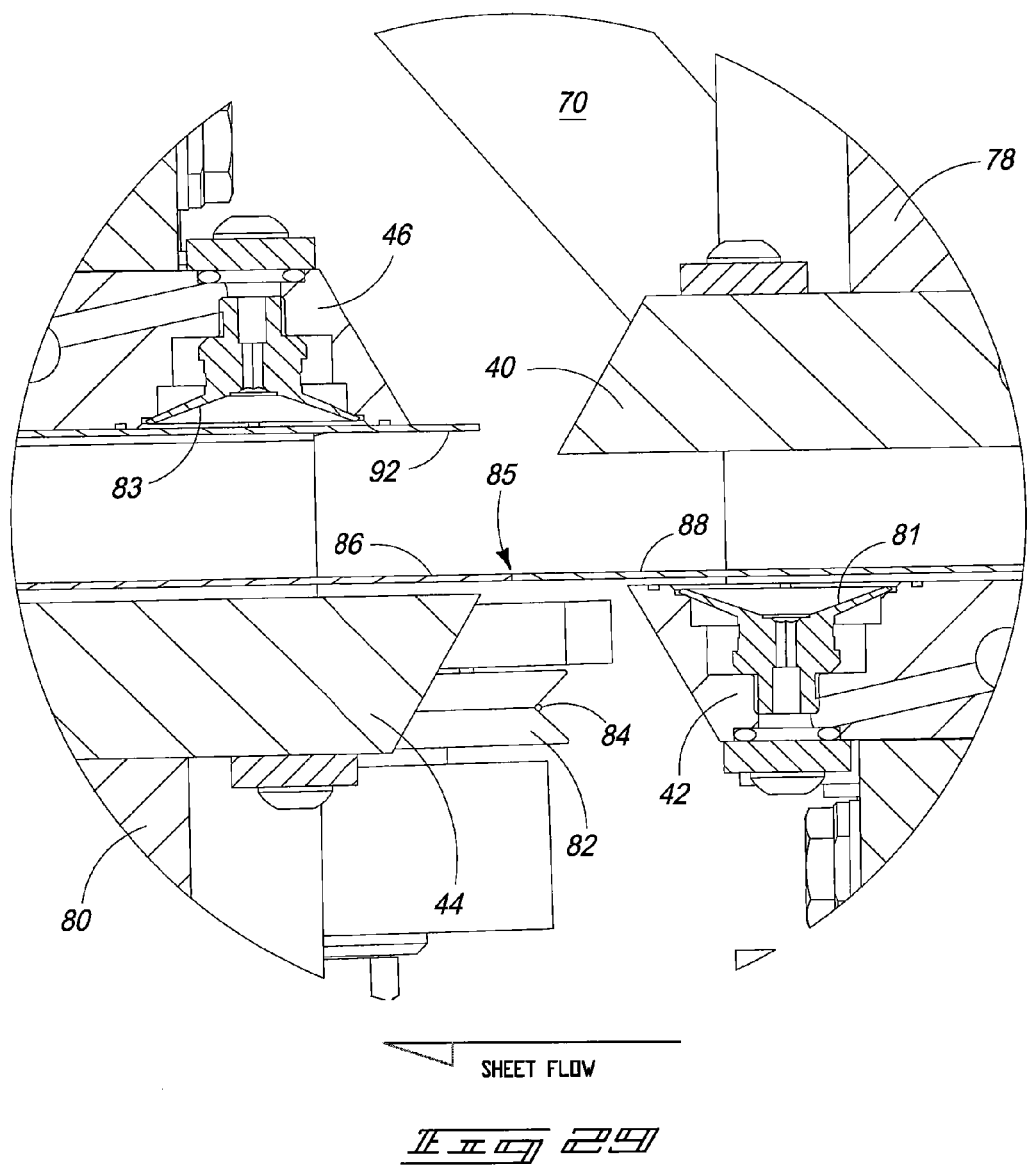
FIG. 29 is an enlarged view taken from the encircled region 29 of FIG. 28.

FIG. 29 is an enlarged view taken from the encircled region 29 of FIG. 28. Fused together sheets 86 and 88 are being advanced to show splice 85. This splice operation occurs quick enough that a continuous sheet 86/88 can be spliced together to feed a continuously operating thermoforming operation without having to stop and start the thermoforming machine.

In one exemplary implementation, tests were run using polystyrene foam sheet with 8.5 pound density and 0.1" (one hundred thousandth inch) thickness. A one (1) millimeter diameter Inconel® X750 hot wire was heated to 800 degrees Farenheit (a range of 700 to about 1200 degrees Farenheit has been found to work for various materials). A melt-back distance (see FIGS. 25A and 25B) on each sheet of 0.115" inches was achieved and a 0.025" "mash" distance was achieved on each sheet. It was found through preliminary testing that any delays greater than 200 milliseconds from the time heat was removed from the sheet edges and the time that "mash" initiated resulted in a non-desirable weakening in strength and resilience of the resulting splice. It is presently believed that air quickly cools a surface along each melted bead on each sheet edge, and the "mash" step of FIG. 27B (occurring at a higher speed) better intermixes the internal melted regions of each melted bead, thereby resulting in a stronger splice.

FIG. 30 is a component perspective view of the entrance vacuum bar assembly 130 shown in FIGS. 6 and 9. Assembly 130 is formed by an upper vacuum bar stiffener plate 48 that is mounted for reciprocation in parallel relation relative to a lower vacuum bar stiffener plate 50 via a pair of parallel die post assemblies 144 and 145. A pair of tilt linkages 228 and 229 on splice alignment mechanism 96 (see FIG. 34) attach via pivotally supported and threaded attachment bolts 212 and 213, respectively, in threaded engagement with sheet thickness mounts 116 and 117 to a top end of plate 48 in order to adjust vertical positioning of plate 48 during a splicing operation. A pair of toggle brackets 236 and 237 on splice alignment mechanism 96 (see FIG. 34) attach via pivotally supported and threaded attachment bolts 210 and 211, respectively, in threaded engagement with clamping drive mounts 108 and 110 to a bottom end of plate 50 in order to adjust vertical positioning of plate 50 during a splicing operation. Furthermore, a pair of eccentric cam linkages 256 and 257 on splice tilt mechanism 94 (see FIG. 35) attach via pivotally supported and threaded attachment bolts 220 and 221, respectively, to cam mounts 112 and 113 along a bottom edge of plate 50 in order to tilt the assembly of plates 48 and 50 toward and away from the assembly of plates 52 and 54 when delivering severed ends of an old web and a new web toward a heating wire during a heating operation, as well as when driving together the heated ends during a fusing, or mash operation (see FIGS. 25-27). Each bolt 220 and 221 passes through a cylindrical cam spacer 114 and 115, respectively, before threading into respective mount 112 and 113.

Plate 48 is supported for up and down reciprocation atop plate 50 via die post assemblies 144 and 145, as shown in FIG. 30. Assemblies 144 and 145 are each respectively formed from a double rod pneumatic cylinder 138 and 140 that is mounted at both ends of a cylinder mount base bracket 146 and 147, respectively. One suitable cylinder 138, 139 is an SMC Model No. NCDGWBA50, High Speed/Precision Cylinder, Double Acting, Single Rod, pneumatic cylinder sold by SMC Corp of America, US Headquarters, 10100 SMC Blvd., Noblesville, Ind. 46060. No pneumatic fluid is delivered to each cylinder. Instead, pneumatic supply fittings at opposed ends of each cylinder are joined together with a pneumatic tube in order to prevent contaminants from entering each cylinder. A central body of each cylinder 138 and 140 is secured onto plate 48 via a cylindrical clamp assembly 118 and 119, respectively. A vacuum bar end clamp, such as clamp 120, secures each end of vacuum bar 40 onto the central body of each cylinder 138 and 140. Die post assemblies 144 and 145 are constructed in a manner similar to die post assemblies 142 and 143, described in greater detail below with reference to FIG. 31.

Servo bar 40 and clamp bar 42 of FIG. 30 each receive a vacuum via a plurality of flexible vacuum tubes 106 and 107. Tubes 106 and 107 are fluidly coupled to common vacuum manifolds 102 and 103, respectively, that receive a vacuum source via main vacuum lines 104 and 105. Such vacuum is selectively applied and removed during a splicing operation when necessary to retain and release a section of thermoformable web material.

Clamp bar 42 is supported by a plurality of double acting, double rod pneumatic cylinders 60, as shown in FIG. 30. Each cylinder 60 is mounted at each rod end to plate 50 and a cylinder attachment bar 159 that is secured onto plate 50 via a cylinder mounting bar 158. A body of each cylinder is secured with threaded fasteners onto a bottom surface of clamp bar 42. One suitable cylinder 60 is an SMC Model No. SMC MUWB 50-25D, plate cylinder, double acting, double rod, pneumatic cylinder sold by SMC Corp of America, US Headquarters, 10100 SMC Blvd., Noblesville, Ind. 46060. A cylindrical plastic bumper 160 is provided on one rod of each cylinder 60 away from bar 42 to limit lateral movement to a predetermined amount. A pneumatic manifold 122 supplies pressurized air, or pneumatic fluid via fluid lines to each actuator 60.

FIG. 31 is a component perspective view of the exit vacuum bar assembly 132 shown in FIGS. 6 and 9. Assembly 132 is formed by an upper vacuum bar stiffener plate 48 that is mounted for reciprocation in parallel relation relative to a lower vacuum bar stiffener plate 50 via a pair of parallel die post assemblies 142 and 143. A pair of tilt linkages 232 and 233 on splice alignment mechanism 96 (see FIG. 34) attach via pivotally supported and threaded attachment bolts 216 and 217, respectively, in threaded engagement with sheet thickness mounts 176 and 177 to a bottom end of plate 52 in order to adjust vertical positioning of plate 52 during a splicing operation. A tilt spacer bushing 180 is provided in each mount 176 and 177 (see FIG. 6). A pair of toggle brackets 238 and 239 on splice alignment mechanism 96 (see FIG. 34) attach via pivotally supported and threaded attachment bolts 214 and 215, respectively, in threaded engagement with clamping drive mounts 170 and 172 to a top end of plate 54 in order to adjust vertical positioning of plate 54 during a splicing operation. Furthermore, a pair of eccentric cam linkages 258 and 259 on splice tilt mechanism 94 (see FIG. 35) attach via pivotally supported and threaded attachment bolts 222 and 223, respectively, to cam mounts 174 and 175 along a top edge of plate 54 in order to tilt the assembly of plates 52 and 54 toward and away from the assembly of plates 48 and 50 when delivering severed ends of an old web and a new web toward a heating wire during a heating operation, as well as when driving together the heated ends during a fusing, or mash operation (see FIGS. 25-27). Each bolt 222 and 223 passes through a cylindrical cam spacer bushing 178 and 179, respectively, before threading into respective mount 174 and 175.

Plate 52 is supported for up and down reciprocation beneath plate 54 via die post assemblies 142 and 143, as shown in FIG. 31. Assemblies 142 and 143 are each respectively formed from a double rod pneumatic cylinder 134 and 136 that is mounted at both ends of a cylinder mount base bracket 146 and 147, respectively. One suitable cylinder 134, 136 is an SMC Model No. NCDGWBA50, High Speed/Precision Cylinder, Double Acting, Single Rod, pneumatic cylinder sold by SMC Corp of America, US Headquarters, 10100 SMC Blvd., Noblesville, Ind. 46060. No pneumatic fluid is delivered to each cylinder. Instead, pneumatic supply fittings at opposed ends of each cylinder are joined together with a pneumatic tube in order to prevent contaminants from entering each cylinder. A central body of each cylinder 134 and 136 is secured onto plate 44 via a cylindrical clamp assembly 154 and 155, respectively. A vacuum bar end clamp, such as clamp 152, secures each end of vacuum bar 40 onto the central body of each cylinder 134 and 136. Die post assemblies 142 and 143 are constructed in a manner similar to die post assemblies 138 and 140, described in greater detail above with reference to FIG. 30.

Servo bar 44 and clamp bar 46 of FIG. 31 each receive a vacuum via a plurality of flexible vacuum tubes 166 and 167. Tubes 166 and 167 are fluidly coupled to common vacuum manifolds 162 and 163, respectively, that receive a vacuum source via main vacuum lines 164 and 165. Such vacuum is selectively applied and removed during a splicing operation when necessary to retain and release a section of thermoformable web material.

Clamp bar 46 is supported by a plurality of double acting, double rod pneumatic cylinders 60, as shown in FIG. 31. Each cylinder 60 is mounted at each rod end to plate 54 and a cylinder attachment bar 159 that is secured onto plate 54 via a cylinder mounting bar 158. A body of each cylinder is secured with threaded fasteners onto a top surface of clamp bar 46. One suitable cylinder 60 is an SMC Model No. SMC MUWB 50-25D, plate cylinder, double acting, double rod, pneumatic cylinder sold by SMC Corp of America, US Headquarters, 10100 SMC Blvd., Noblesville, Ind. 46060. A cylindrical plastic bumper 160 is provided on one rod of each cylinder 60 away from bar 46 to limit lateral movement to a predetermined amount. A pneumatic manifold 168 supplies pressurized air, or pneumatic fluid via fluid lines to each actuator 60.

Figure 32:
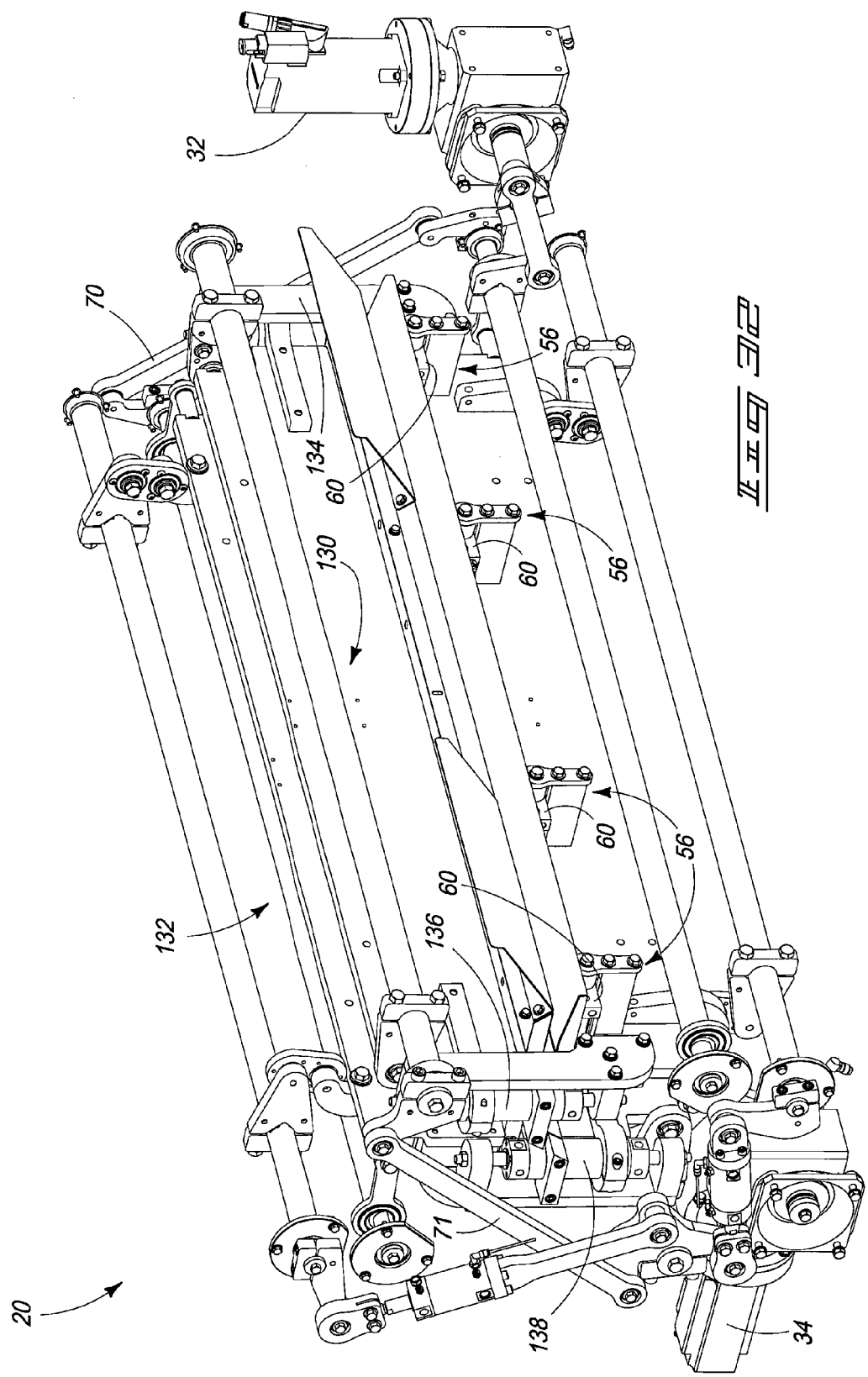
FIG. 32 is a component perspective view of the splice section assembly of FIG. 8 taken from the same end of the machine, but omitting the hot wire web cutting mechanism to simplify the drawing.

FIG. 32 is a component perspective view of the splice section assembly 20 of FIG. 8 taken from the same end of the machine. A lateral scrap retraction assembly 56 is shown with a plurality of spaced-apart pneumatic cylinders 60 (see FIG. 9) used to laterally retract clamp bar 42, as shown in FIG. 21. Splice section assembly 20 includes entrance vacuum bar assembly 130 and exit vacuum bar assembly 132 which are articulated to desirable positions using the kinematic mechanisms described below with reference to FIGS. 34 and 35.

Figure 33:
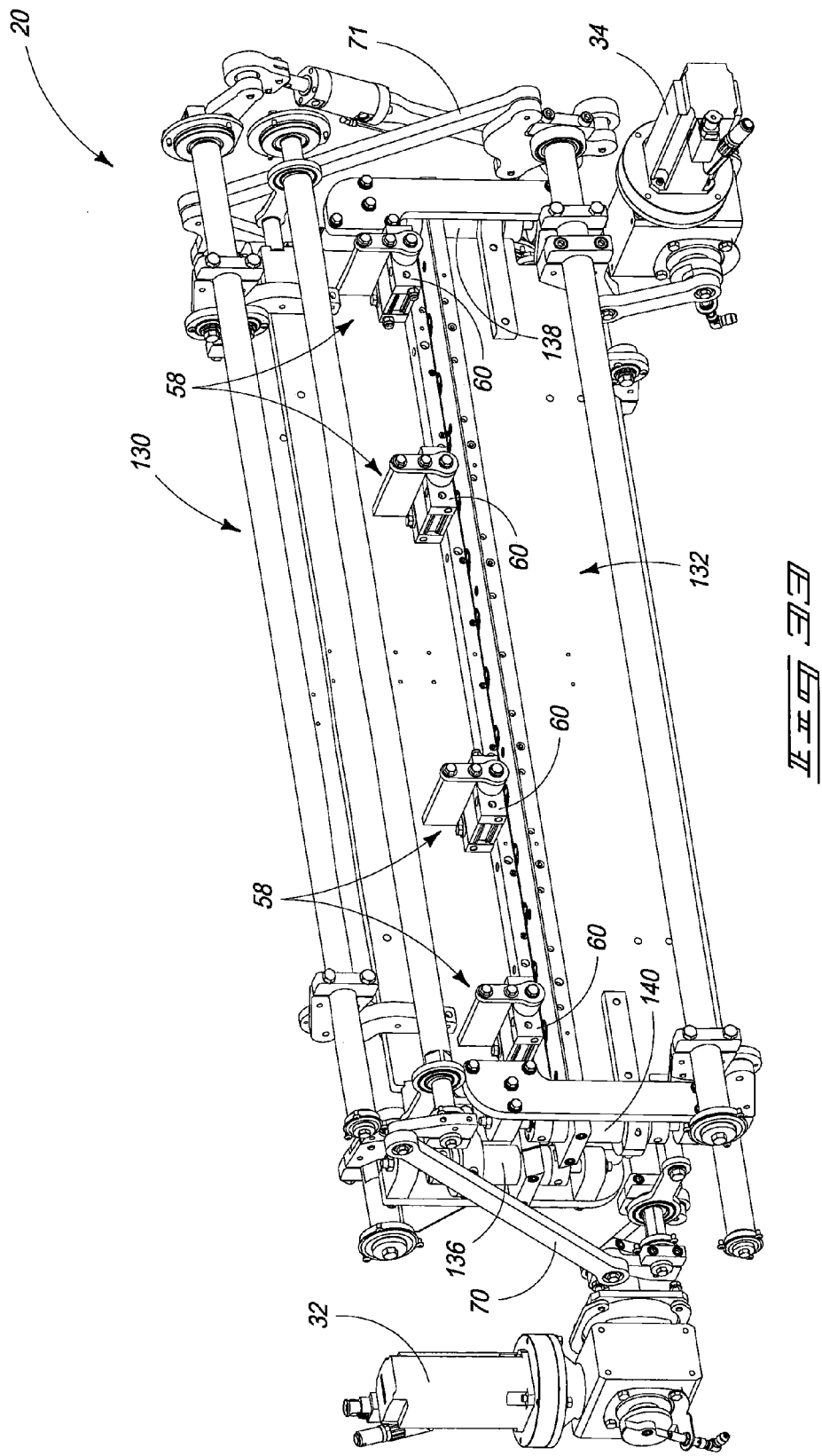
FIG. 33 is a component perspective view of the splice section assembly of FIGS. 8 and 30 taken from an opposite end of the machine.

FIG. 33 is a component perspective view of the splice section assembly of FIGS. 8 and 32 taken from an opposite end of the machine and showing lateral scrap retraction assembly 58 used to laterally retract clamp bar 46, as shown in FIG. 21. Interconnecting cross members 70 and 71 are provided in order to couple together the kinematic motions of entrance vacuum bar assembly 130 and exit vacuum bar assembly 132.

Figure 34:
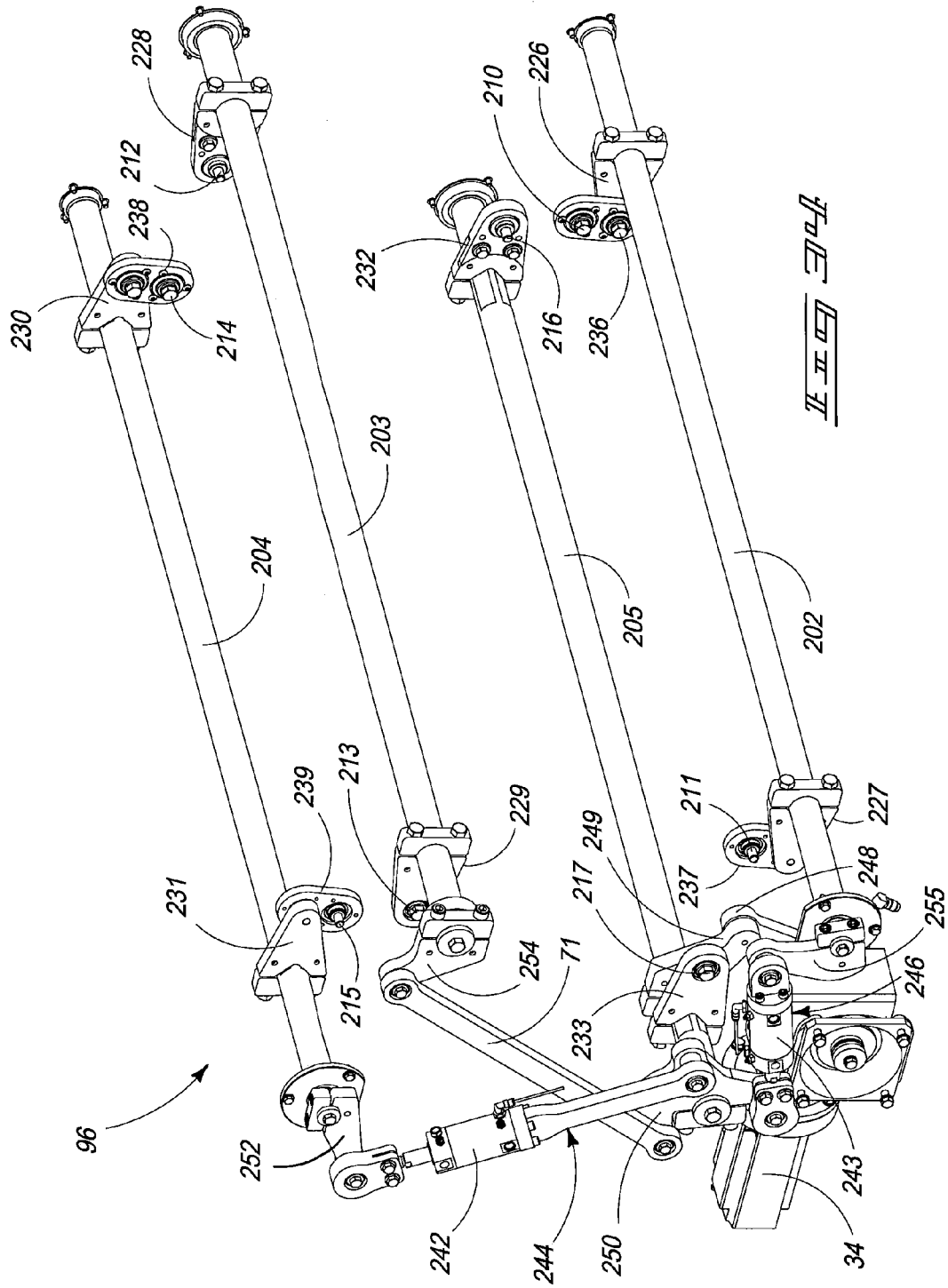
FIG. 34 is a component perspective view of the splice alignment assembly mechanism taken from the same end as FIG. 33.
Figure 35:
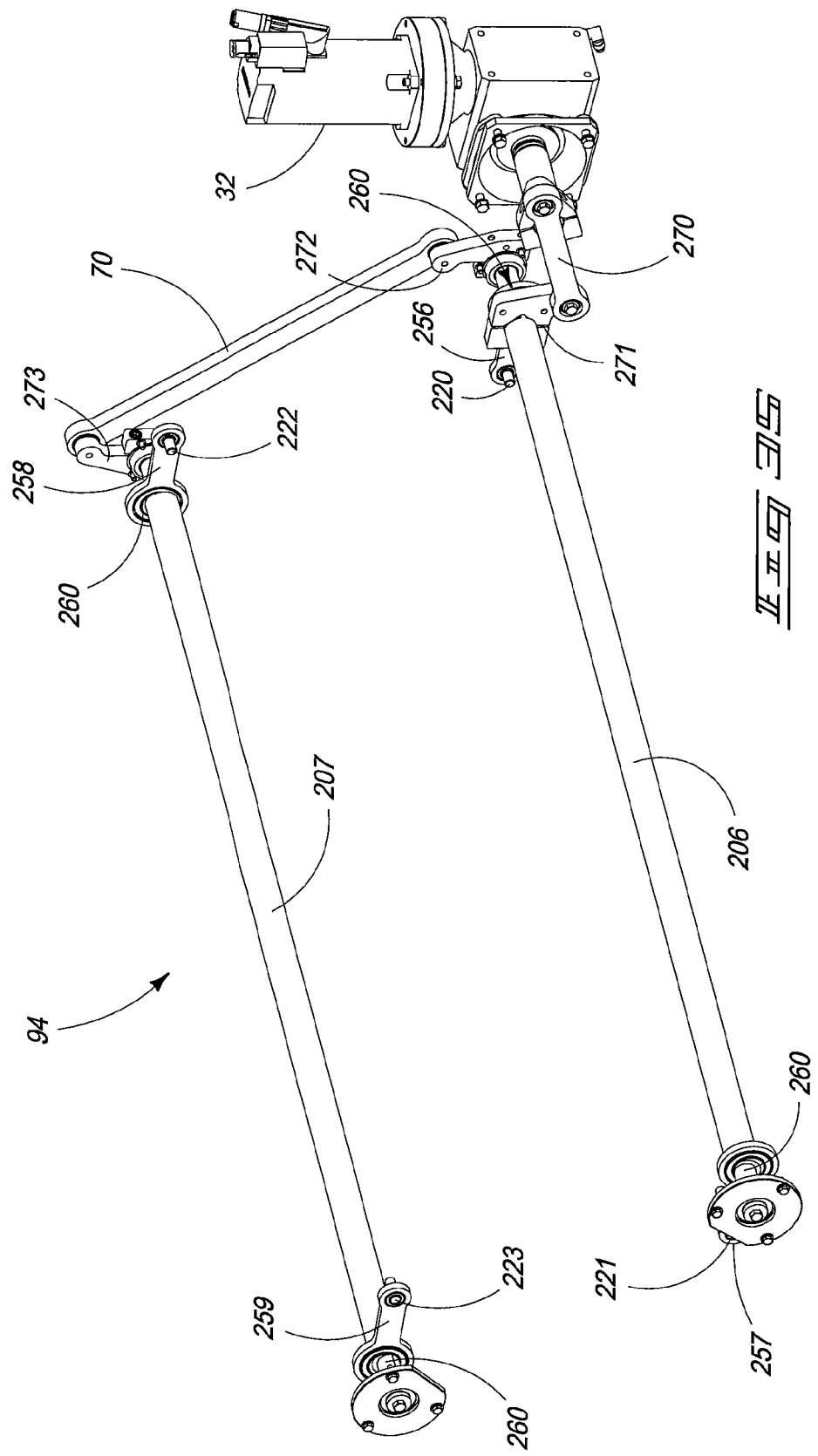
FIG. 35 is a component perspective view of the splice tilt mechanism taken from the same end as FIG. 33.

FIG. 34 is a component perspective view of the splice alignment mechanism 96 taken from the same end as FIG. 33. Splice alignment mechanism 96 articulates entrance vacuum bar assembly 130 (see FIG. 30) and exit vacuum bar assembly 132 (see FIG. 32) so as to perform the vertical alignment between sheets 86 and 88, as shown in FIGS. 22 and 23. More particularly, servo motor 34 drives splice alignment mechanism 96 back and forth via primary crank arm 248 and a secondary crank arm 249, as shown in FIGS. 34 and 35. Crank arm 249 pivots shaft 205 back and forth so as to pivot tilt linkages 232 and 233 up and down, which raises and lowers fasteners 216 and 217, respectively.

As shown in FIG. 34, a compound crank arm 250 is affixed onto an end of shaft 205 in order to drive remaining shafts 202-204 in corresponding pivotal motion. Shafts 202-205 are each mounted at each end to opposed walls on frame 12 with rotary bearing assemblies. A drive linkage 246 is pivotally affixed via a bearing mount onto crank arm 250 and via a second bearing mount onto a driven crank arm 255. Crank arm 255 is affixed onto an end of shaft 202 to drive tilt linkages 226 and 227 in corresponding up and down motion. A pair of toggle brackets 236 and 237 are pivotally coupled with bearing mounts onto tilt linkages 226 and 227, respectively. Fasteners 210 and 211 are each mounted with bearing mounts onto top ends of each respective toggle bracket 236 and 237, Drive linkage 246 includes a pneumatic cylinder 243 that is pressurized during use so as to provide a spring within linkage 246. One suitable pneumatic cylinder 243 is an SMC Model No. NCG50-ICN004-0100, SMC NCG CYLINDER 50 mM BORE 1" STROKE W/AIR CUSHION & 5/8-11 THREAD, pneumatic cylinder sold by SMC Corp of America, US Headquarters, 10100 SMC Blvd., Noblesville, Ind. 46060. Likewise, another drive linkage 244 is pivotally affixed via a bearing mount onto crank arm 250 and via a second bearing mount onto a driven crank arm 252. Crank arm 252 is affixed onto an end of shaft 204 to drive tilt linkages 230 and 231 in corresponding up and down motion. A pair of toggle brackets 238 and 239 is pivotally coupled with bearing mounts onto tilt linkages 230 and 231, respectively. Fasteners 214 and 215 are each mounted with bearing mounts onto bottom ends of each respective toggle bracket 238 and 239. Drive linkage 244 includes a pneumatic cylinder 242 that is pressurized during use so as to provide a spring within linkage 244. One suitable pneumatic cylinder 242 is an SMC Model No. NCG50-ICN004-0100, SMC NCG CYLINDER 50 mM BORE 1" STROKE W/AIR CUSHION & 5/8-11 THREAD, pneumatic cylinder sold by SMC Corp of America, US Headquarters, 10100 SMC Blvd., Noblesville, Ind. 46060. Finally, a drive linkage 71 is pivotally affixed via a bearing mount onto crank arm 250 and via a second bearing mount onto a driven crank arm 254. Crank arm 254 is affixed onto an end of shaft 203 to drive tilt linkages 228 and 229 in corresponding up and down motion. Tilt linkages 228 and 229 drive fasteners 212 and 213, respectively, up and down.

FIG. 35 is a component perspective view of the splice tilt mechanism 94 taken from the same end as FIG. 32. This mechanism 94 tilts or pivots the bars in order to drive together sheets 86 and 88, as shown in FIGS. 23-27B. Splice tilt mechanism 94 articulates entrance vacuum bar assembly 130 (see FIG. 30) and exit vacuum bar assembly 132 (see FIG. 32) so as to move together ends of sheets 86 and 88 during the steps of FIGS. 24-26, as well as during the "mash" operation of FIGS. 26-27. More particularly, shaft 207 supports a pair of eccentric cam bearing assemblies 260 provided in eccentric cam linkages 258 and 259. Likewise, shaft 206 supports a pair of eccentric cam bearing assemblies 260 provided in eccentric cam linkages 256 and 257. Each cam bearing assembly is formed by machining an offset axis cylindrical outer surface that is offset from the center of axis of the respective shaft. A crescent moon shaped segment that complements the outer surface combines to fill in the inner cylindrical surface of an inner bearing race of the cam bearing assembly 260. Alternatively, a cylindrical end segment of each shaft 206 and 207 can be cut off and welded onto a respective end of the shaft so as to create a cylindrical segment with a center axis offset from the center axis of the respective shaft. Other techniques for forming an eccentric cam bearing assembly can also be used so as to convert rotational motion of each shaft into laterally reciprocating motion of each eccentric cam linkage 256-259. Bearing supported bolts 220-223 mount into respective cam mounts 114, 115 (see FIG. 30) and 174, 175 (see FIG. 31) so that splice tilt mechanism drives entrance vacuum bar assembly 130 (see FIG. 30) and exit vacuum bar assembly 132 (see FIG. 31). Tilt motor 32 drives eccentric cam linkages 256-259 substantially horizontally to and fro by rotating shafts 206 and 207 through rotatable coupling of crossbar 70 and coupled crank arms 272 and 273. Tilt motor 32 drives shaft 206 in back and forth rotation via primary crank arm 270 and secondary crank arm 271.

Figure 36:
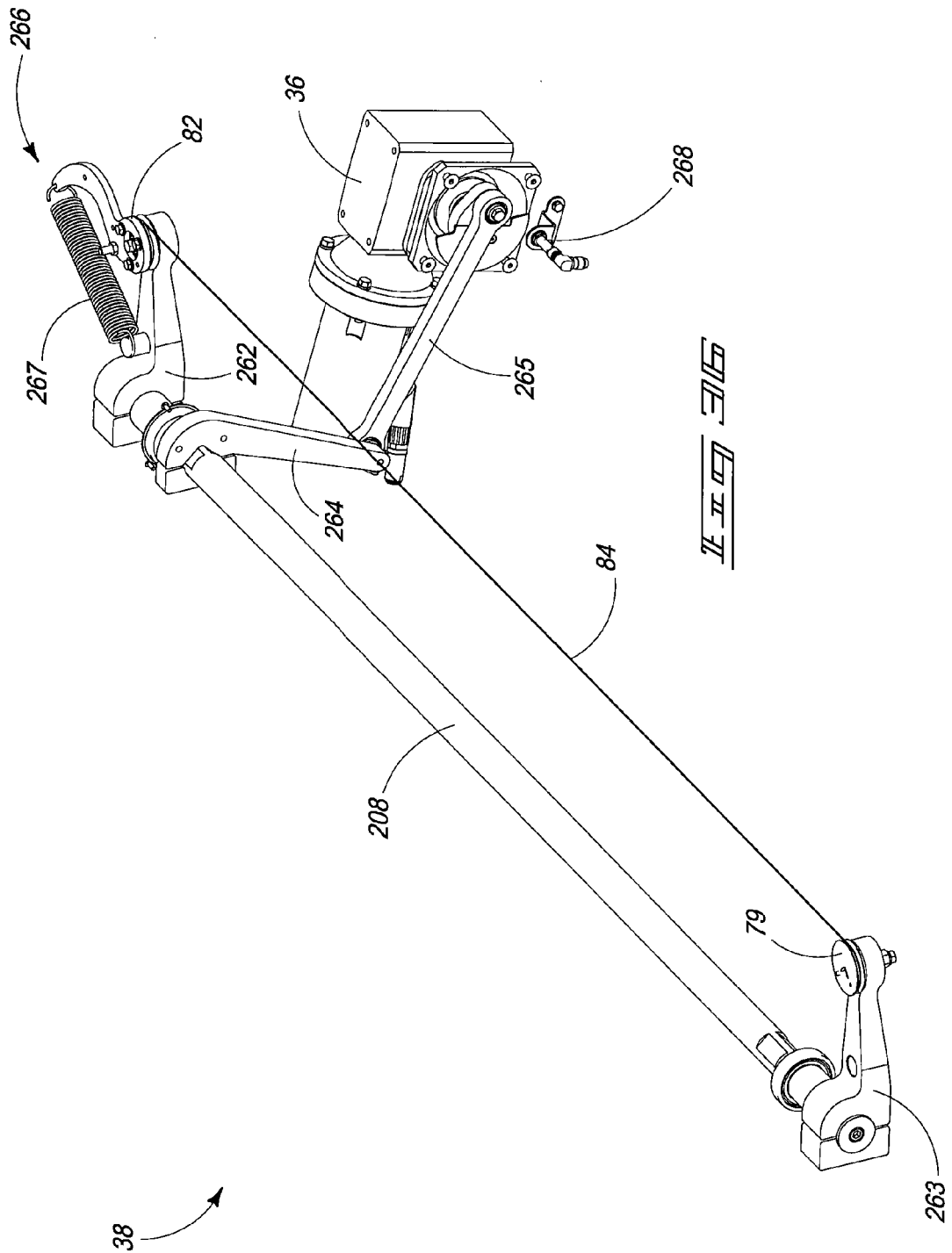
FIG. 36 is a component perspective view of an assembly for the hot wire web cutting mechanism.

FIG. 36 illustrates one implementation for a web cutting apparatus comprising a hot wire web cutting mechanism 38. Optionally, a blade or scissor cutting mechanism can be used to cut a terminal end of an old web and a leading end of a new web prior to splicing them together. More particularly, web cutting mechanism 38 comprises a hot wire 84 carried under tension between a pair of wheels 79 and 82. Wheels 79 and 82 each receive wire 84 is a circumferential outer groove. Wheel 82 is pivotally supported by an arm 262 (with a bearing) and includes an integral arm rotates wheel 82 so as to tension wire 84 as a result of a tensioned coil spring 267. Wheel 79 is rigidly mounted on arm 263. Arms 262 and 263 are rigidly secured on opposite ends of a cylindrical shaft 208. A drive arm 264 secures onto shaft 208 and drives shaft 208 into rotation in order to raise and lower wire 84. Shaft 208 is supported at each end with a rotational bearing supported by end plates of the frame 12 for apparatus 10 (see FIG. 1). A crank arm 264 drives arm 264 and shaft 208 in response to activation of a hot wire servo drive motor 36. A electromagnetic sensor 268 detects position of motor 36 base upon movement of a base plate on motor 36.

FIG. 37 is a logic flow diagram illustrating the steps implemented by the control system when setting up and performing a splice between a trailing end of an old, or first web and a leading end of a new, or second web.

In Step "S1", a thermoforming machine, web splicer and web accumulator are provided along with a source of thermoformable web comprising an old web and a new web to be spliced onto the old web. The web accumulator has an articulating frame and a height adjustable roller provided along a downstream end of the splicer. A control system is also provided along with an actuator that is controlled to articulate the frame so as to raise and lower the roller when accumulating extra web and releasing the accumulated web when splicing the new web onto the old web so that a downstream thermoforming machine can run at a consistent cyclical rate, even during a splicing operation. After performing Step "S1", the process proceeds to Step "S2".

In Step "S2", an operator determines a cycle time for the operating thermoforming machine for a specific thermoformable web and a specific die set. After performing Step "S2", the process proceeds to Step "S3".

In Step "S3", an operator determines a shot length for the operating thermoforming machine for a specific thermoformable web and a specific die set. After performing Step "S3", the process proceeds to Step "S4".

In Step "S4", an operator sets a splice cycle time for the web splicer. After performing Step "S4", the process proceeds to Step "S5".

In Step "S5", an operator determines a minimum length of surplus web needed by the thermoforming machine during a splice cycle time. After performing Step "S5" the process proceeds to Step "S6".

In Step "S6", a control system drives the splicer to deliver the old web through the splicer and to an operating thermoforming machine to accumulate at least the minimum length of web, or sheet. Concurrent with or after performing Step "S6", the process proceeds to Step "S7".

In Step "S7", an operator arms the splicer to automatically perform a splice in response to a web terminal end condition being detected for the old web. In one case, a preselected time delay is provided between detecting the condition and performing the splice. In another case, the splice occurs immediately after detecting the condition. After performing Step "S7", the process proceeds to Step "S8".

In Step "S8", the control system detects with a sensor presence of a terminal end condition for the old web. If a terminal end condition is detected, the process proceeds to Step "S9". If not, the process returns to Step "S8".

In Step "S9", the control system drives the actuator to raise the accumulator roller sufficient to accumulate a length of surplus web needed for use when splicing a leading end of a new web to a terminal end of the old web. After performing Step "S9", the process proceeds to Step "S10".

In Step "S10", the control system drives the actuator to lower the accumulator roller sufficient to supply the accumulated length of surplus web for use by the thermoforming machine while splicing the old web to the new web. After performing Step "S10", the process proceeds to Step "S11".

In Step "S11", the new web becomes an old web and a subsequent new web is provided to the splicer. After performing Step "S11", the process proceeds to Step "S7". If a new web is not provided, the process is terminated.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An apparatus for joining together thermoformable sheets, comprising:

a frame;

a nip roller assembly carried by the frame and having a pair of counter-rotating nip rollers and a drive motor configured to drive at least one of the nip rollers in forward and reverse rotation to move at least one of a new sheet and an old sheet along a sheet travel path;

an entrance sheet clamp assembly supported by the frame downstream of the nip roller assembly and having a pair of opposed entrance sheet clamping members supported by the frame each provided on opposite sides of the sheet travel path for translation of at least one relative to another between an extended position and a retracted position generally perpendicular to the sheet travel path, both entrance sheet clamping members having a vacuum surface, wherein one of the entrance sheet clamping members is further supported by the frame for lateral retraction and extension substantially parallel to the sheet travel path;

an exit sheet clamp assembly supported by the frame downstream of the entrance vacuum clamp bar assembly and having a pair of opposed exit sheet clamping members supported by the frame each on opposite sides of the sheet travel path for translation of at least one relative to another between an extended position and a retracted position generally perpendicular to a sheet travel path, both exit sheet clamping members having a vacuum surface, wherein one of the exit sheet clamping members is further supported by the frame for lateral retraction and extension substantially parallel to the sheet travel path, the one exit sheet clamping member provided on an opposite side of the sheet travel path from the one entrance sheet clamping member;

a sheet severing mechanism for severing an overlapped old sheet and a new sheet provided along the sheet travel path; and at least one actuator carried by the frame and configured to move the one exit sheet clamping member and the one entrance sheet clamping member toward and away from a splice location on the sheet travel path to retract scrap sheet away from the splice location between the entrance sheet clamp assembly and the exit sheet clamp assembly.

2. The apparatus of claim 1, further comprising an actuator coupled with the entrance sheet clamp assembly and configured to move the entrance sheet clamp assembly toward and away from the exit sheet clamp assembly.

3. The apparatus of claim 1, further comprising an actuator coupled with the exit sheet clamp assembly and configured to move the exit sheet clamp assembly toward and away from the entrance sheet clamp assembly.

4. The apparatus of claim 1, further comprising a tilt mechanism coupled with the entrance sheet clamp assembly and the exit sheet clamp assembly and configured to tilt the entrance sheet clamp assembly and the exit sheet clamp assembly toward and away from one another.

5. The apparatus of claim 1, further comprising a sheet adjust mechanism coupled with the entrance sheet clamp assembly and the exit sheet clamp assembly and configured to reposition another of the exit sheet clamping members and another of the entrance sheet clamping member to align an old sheet and a new sheet prior to heating and butt-welding together.

6. The apparatus of claim 1, wherein the sheet severing mechanism comprises a hot wire.

7. The apparatus of claim 6, wherein the one entrance sheet clamping member and the one exit sheet clamping member are each retracted from a respective another of the entrance sheet clamping member and the another of the exit sheet clamping member while applying a vacuum to separate the old sheet from the new sheet while the hot wire is moved through the old sheet and the new sheet during a sheet severing operation.

8. The apparatus of claim 7, wherein the at least one actuator is operative to laterally retract each vacuum clamping member away from a splice line for clearance during a splicing operation.

9. The apparatus of claim 1, wherein the sheet severing mechanism comprises a blade cutting mechanism.

10. An apparatus for joining together thermoformable sheets, comprising:
a frame;
a sheet feed assembly carried by the frame configured to drive at least one of a new sheet and an old sheet along a sheet travel path;
an entrance sheet clamp assembly supported by the frame downstream of the sheet feed assembly and having a pair of opposed entrance sheet clamping members supported by the frame each provided on opposite sides of the sheet travel path for translation of at least one relative to another between an extended position and a retracted position, both entrance sheet clamping members having a vacuum surface, wherein one of the entrance sheet clamping members is further supported by the frame for lateral retraction and extension generally parallel to the sheet travel path;
an exit sheet clamp assembly supported by the frame downstream of the entrance sheet clamp assembly and having a pair of opposed exit sheet clamping members supported by the frame each on opposite sides of the sheet travel path for translation of at least one relative to another between an extended position and a retracted position generally perpendicular to a sheet travel path, one of the exit sheet clamping members further supported for retraction and extension in a direction generally parallel to the sheet travel path, both exit sheet clamping members having a vacuum surface;
a sheet severing mechanism for severing an old sheet and new sheet while provided in overlapped relation alongside the sheet travel path; and
at least one actuator carried by the frame and configured to move the one exit sheet clamping member and the one entrance sheet clamping member toward and away from a splice location on the sheet travel path to retract scrap sheet away from the splice location between the entrance sheet clamp assembly and the exit sheet clamp assembly.

11. The apparatus of claim 10, wherein the sheet severing mechanism comprises a hot wire web cutting mechanism.

12. The apparatus of claim 11, wherein the at least one actuator is configured to move each of the one entrance sheet clamping member and the exit sheet clamping member toward the splice.

13. The apparatus of claim 10, wherein the sheet severing mechanism comprises a blade cutting mechanism.

14. The apparatus of claim 10, further comprising a sheet adjust mechanism coupled with the sheet clamp assembly and the exit sheet clamp assembly and configured to reposition another of the entrance sheet clamping member relative to another of the exit sheet clamping member to align an old sheet and a new sheet prior to heating and butt-welding together the old sheet and the new sheet.

15. The apparatus of claim 10, wherein the one entrance sheet clamping member and the exit sheet clamping member are each retracted from a respective another of the entrance sheet clamping member and the another of the exit sheet clamp member while applying a vacuum to separate the old sheet from the new sheet while the hot wire is moved through the old sheet and the new sheet during a sheet severing operation.

16. A thermoformable sheet joining apparatus, comprising:
a frame;
a nip roller assembly carried by the frame and having a pair of counter-rotating nip rollers and a drive motor configured to drive at least one of the nip rollers in forward and reverse rotation to move at least one of a new sheet and an old sheet along a sheet travel path;
an entrance sheet clamp assembly supported by the frame downstream of the nip roller assembly and having a pair of opposed entrance sheet clamping members supported by the frame each provided on opposite sides of the sheet travel path for translation of at least one relative to another between an extended position and a retracted position, both entrance sheet clamping members having a vacuum surface, wherein one of the entrance sheet clamping members is further supported by the frame for retraction and extension generally parallel to the sheet travel path;
an exit sheet clamp assembly supported by the frame downstream of the entrance sheet clamp assembly and having a pair of opposed exit sheet clamping members supported by the frame each on opposite sides of the sheet travel path for translation of at least one relative to another between an extended position and a retracted position generally parallel to a sheet travel path, one of the entrance sheet clamping member and the exit sheet clamping member further supported for retraction and extension in a direction generally parallel to the sheet travel path;
a kinematic linkage carried by the frame and configured to move the one exit sheet clamping member and the one entrance sheet clamping member toward and away from a splice location on the sheet travel path to retract scrap sheet away from the splice location between the entrance sheet clamp assembly and the exit sheet clamp assembly.

17. The thermoformable sheet joining apparatus of claim 16, wherein the kinematic linkage comprises an actuator.

18. The thermoformable sheet joining apparatus of claim 16, further comprising a sheet severing mechanism for severing an old sheet and new sheet.

19. The thermoformable sheet joining apparatus of claim 18, wherein the sheet severing mechanism comprises a hot wire sheet cutting mechanism.

20. The thermoformable sheet joining apparatus of claim 16, wherein the sheet severing mechanism comprises a cutting blade.

* * * * *